United States Patent
Oyama

(10) Patent No.: US 9,052,185 B2
(45) Date of Patent: *Jun. 9, 2015

(54) ROTATION DETECTING DEVICE

(71) Applicant: Hirose Electric Co., Ltd., Tokyo (JP)

(72) Inventor: Shoji Oyama, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 14/016,638

(22) Filed: Sep. 3, 2013

(65) Prior Publication Data

US 2014/0062465 A1    Mar. 6, 2014

(30) Foreign Application Priority Data

Sep. 4, 2012 (JP) .................................. 2012-193706

(51) Int. Cl.
*G01B 7/14* (2006.01)
*G01B 7/30* (2006.01)
*G01P 3/487* (2006.01)
*G01D 5/245* (2006.01)

(52) U.S. Cl.
CPC . *G01B 7/30* (2013.01); *G01P 3/487* (2013.01); *G01D 5/245* (2013.01)

(58) Field of Classification Search
CPC .............................. G01P 3/487; G01D 5/2033

USPC ........................... 324/207.15, 207.17, 207.25
See application file for complete search history.

(56) References Cited

U.S. PATENT DOCUMENTS

| 6,259,248 B1 * | 7/2001 | Gotoh et al. ............. 324/207.15 |
| 2014/0062366 A1 * | 3/2014 | Yoshidomi et al. ...... 318/400.39 |

FOREIGN PATENT DOCUMENTS

| JP | 2000-161989 A | 6/2000 |
| JP | 2001-194182 A | 7/2001 |

* cited by examiner

*Primary Examiner* — Reena Aurora
(74) *Attorney, Agent, or Firm* — Kubotera & Associates, LLC

(57) ABSTRACT

A rotation detecting device includes rotation detecting device includes a first supporting member and a second supporting member disposed around an axial line. The rotation detecting device further includes a pair of magnetic field generating portions for generating a magnetic field in a region between the first supporting member and the second supporting member. The rotation detecting device further includes at least one magnetic field detecting portion attached to the second supporting member for detecting the magnetic field. The rotation detecting device further includes a first magnetic member for covering one end portion of the magnetic field detecting portion and a second magnetic member for covering the other end portion of the magnetic field detecting portion.

10 Claims, 12 Drawing Sheets

ROTATION DETECTING DEVICE

BACKGROUND TECHNOLOGY AND RELATED TECHNOLOGY

The present invention relates to a rotation detecting device for detecting a rotation of a detection subject using a magnetic force.

Patent Reference 1 has disclosed a conventional rotation detecting device (a magnetic sensor for detecting a rotation). The conventional rotation detecting device disclosed in Patent Reference 1 includes a detection element, in which a detection coil is wound around a wire-shaped magnetic element capable of generating a large Barkhausen jump. In the conventional rotation detecting device, a plurality of permanent magnets having polarities alternately changed is arranged with a constant interval on a drum-shaped substrate having a rotational center axis to be connected to a detection object.

Patent Reference 1: Japanese Patent Publication No. 2001-194182

In the conventional rotation detecting device disclosed in Patent Reference 1, when the drum-shaped substrate is rotated, the permanent magnets sequentially pass through near the wire-shaped magnetic element, so that an alternate magnetic field is applied to the wire-shaped magnetic element. As a result, an orientation of magnetization of the wire-shaped magnetic element is sequentially changed, so that a pulse signal representing the rotational state of the drum-shaped substrate is output from the detection coil.

In the conventional rotation detecting device disclosed in Patent Reference 1, the wire-shaped magnetic element extends in a direction in parallel to the rotational center axis of the drum-shaped substrate. Accordingly, it is difficult to reduce a size of the conventional rotation detecting device in a direction along the rotational center axis.

Patent Reference 2 has disclosed another conventional rotation detecting device (a rotation sensor). The conventional rotation detecting device disclosed in Patent Reference 2 includes a sensor coil, in which a coil wire is wound around an iron core formed of an amorphous magnetic member having a large Barkhausen effect. In the conventional rotation detecting device disclosed in Patent Reference 2, a permanent magnet is attached to a rotational board to be rotated in a specific rotational direction. The sensor coil is arranged such that an axial direction of the iron core is in parallel to a tangential direction of the specific rotational direction of the rotational board. Accordingly, it is possible to reduce a size of the conventional rotation detecting device disclosed in Patent Reference 2 in the direction along the rotational axis, as opposed to the conventional rotation detecting device disclosed in Patent Reference 1.

Patent Reference 2: Japanese Patent Publication No. 2000-161989

In the conventional rotation detecting device disclosed in Patent Reference 2, the sensor coil (the magnetic field detecting portion) is arranged such that a longitudinal direction of the iron core (the magnetic element) is in parallel to the tangential direction of the rotational direction of the rotational board with the permanent magnet attached thereto. However, the conventional rotation detecting device disclosed in Patent Reference 2 has the following problems.

In the conventional rotation detecting device disclosed in Patent Reference 2, when the rotational board is rotated, and the permanent magnet with the N polarity approaches one end portion of the sensor coil, the magnetic field generated with the permanent magnet passes through the iron core from the one end portion to the other end portion of the sensor coil. Accordingly, the iron coil is magnetized in one orientation. Further, when the rotational board is rotated, and the permanent magnet with the N polarity approaches the other end portion of the sensor coil, the magnetic field generated with the permanent magnet passes through the iron core from the other end portion to the one end portion of the sensor coil. Accordingly, the iron coil is magnetized in an orientation opposite to the one orientation described above. As a result, the pulse signal is output from the coil wire of the sensor coil according to the change in the orientation of the magnetization of the iron core.

As described above, in the conventional rotation detecting device disclosed in Patent Reference 2, if the orientation of the magnetization of the iron core is changed only when the permanent magnet approaches the one end portion or the other end portion of the sensor coil while the rotational board is rotating, it is possible to accurately detect the rational state of the rotational board. However, the orientation of the magnetization of the iron core may be changed in other occasion.

For example, when the rotational board is rotated, and the permanent magnet approaches a center portion of the sensor coil in a longitudinal direction thereof, the magnetization of the iron core become an unstable state, thereby changing the orientation of the magnetization of the iron core. However, the orientation of the magnetization of the iron core is not changed always when the permanent magnet approaches the center portion of the sensor coil in the longitudinal direction thereof. Rather, the orientation of the magnetization of the iron core may be or may be not changed. Further, it is difficult to predict whether the orientation of the magnetization of the iron core is changed or not.

In the conventional rotation detecting device disclosed in Patent Reference 2, it is presumed that the orientation of the magnetic field applied to the iron core by the permanent magnet is different in the range from the center portion to the one end portion of the iron core from the range from the center portion to the other end portion of the iron core. Therefore, it is difficult to predict whether the orientation of the magnetization of the iron core is changed or not when the permanent magnet approaches the center portion of the sensor coil in the longitudinal direction thereof.

More specifically, when the orientation of the magnetic field applied to the iron core is different in the range from the center portion to the one end portion of the iron core from the range from the center portion to the other end portion of the iron core, the orientation of the magnetization in the iron core is partially varied. Accordingly, the pulse signal output from the coil wire has a low output level.

Further, it is difficult to consistently generate the large Barkhausen effect, so that the output level of the pulse signal tends to be fluctuated. When the pulse signal has the low output level and tends to be fluctuated, it is difficult to accurately detect the pulse signal with a detection circuit at a later stage. As a result, it is difficult to accurately detect the change in the orientation of the magnetization in the iron core. Therefore, when the orientation of the magnetization is changed unpredictably, it is difficult to accurately detect the rotational state of the rotational board.

In view of the problems of the conventional rotation detecting device described above, an object of the invention is to provide a rotation detecting device capable of solving the problems. According to the rotation detecting device of the present invention, it is possible to prevent an unpredictable change in an orientation of magnetization of a magnet element constituting a magnetic field detecting portion. Accordingly, it is possible to accurately detect a rotation of a detection subject. Further, it is possible to reduce a size of the rotation detecting device in a rotational axis direction thereof.

Further objects and advantages of the invention will be apparent from the following description of the invention.

SUMMARY OF THE INVENTION

In order to attain the objects described above, according to a first aspect of the present invention, a rotation detecting device includes a first supporting member and a second supporting member disposed around an axial line and situated away from each other along the axial line. Further, at least one of the first supporting member and the second supporting member is arranged to be rotatable around the axial line.

According to the first aspect of the present invention, the rotation detecting device further includes a pair of magnetic field generating portions attached to the first supporting member to face the second supporting member for generating a magnetic field in a region between the first supporting member and the second supporting member. Further, the magnetic field generating portions is arranged around the axial line and away from each other along a circumferential direction around the axial line. Further, one of the magnetic field generating portions has a polarity opposite to that of the other of the magnetic field generating portions.

According to the first aspect of the present invention, the rotation detecting device further includes at least one magnetic field detecting portion attached to the second supporting member to face the first supporting member for detecting the magnetic field generated with the magnetic field generating portions. The magnetic field detecting portion includes a magnetic element with a coil wound thereon. The magnetic element is formed in a bar shape, a wire shape, or a plate shape, so that an orientation of magnetization of the magnetic element varies along a longitudinal direction thereof. Further, the magnetic field detecting portion is arranged, so that the longitudinal direction of the magnetic element is in parallel to a tangential direction of a circumference around the axial line and over the magnetic field generating portions.

According to the first aspect of the present invention, the rotation detecting device further includes a first magnetic member formed of a magnetic material and attached to the second supporting member for covering one end portion of the magnetic field detecting portion in the longitudinal direction of the magnetic element that faces the first supporting member. The rotation detecting device further includes a second magnetic member attached to the second supporting member for covering the other end portion of the magnetic field detecting portion in the longitudinal direction of the magnetic element that faces the first supporting member.

According to the first aspect of the present invention, the rotation detecting device the first magnetic member extends toward the second magnetic member at a center portion of the magnetic field detecting portion. Further, the first magnetic member is arranged to face the second magnetic member at the center portion of the magnetic field detecting portion with a space in between.

As described above, according to the first aspect of the present invention, there are disposed on the first supporting member the magnetic field generating portions, for example, the first magnetic field generating portion having the N polarity and the second magnetic field generating portion having the S polarity, arranged away from each other along the circumferential direction around the circumference of the axial line. Accordingly, the magnetic field is generated in the region between the first supporting member and the second supporting member from the first magnetic field generating portion toward the second magnetic field generating portion. When one of the first supporting member and the second supporting member is rotated, the magnetic field detecting portion is relatively moved through the region where the magnetic field is generated along the circumferential direction.

According to the first aspect of the present invention, when one of the first supporting member and the second supporting member is rotated, the first magnetic field generating portion approaches the one end portion of the magnetic field detecting portion in the longitudinal direction, and the second magnetic field generating portion approaches the other end portion of the magnetic field detecting portion in the longitudinal direction. As a result, due to the magnetic field generated from the first magnetic field generating portion toward the second magnetic field generating portion, the magnetic element of the magnetic field detecting portion is magnetized in a direction (an orientation) from the one end portion toward the other end portion of the magnetic field detecting portion in the longitudinal direction.

Similarly, according to the first aspect of the present invention, when one of the first supporting member and the second supporting member is rotated, the first magnetic field generating portion approaches the other end portion of the magnetic field detecting portion in the longitudinal direction, and the second magnetic field generating portion approaches the one end portion of the magnetic field detecting portion in the longitudinal direction. As a result, due to the magnetic field generated from the first magnetic field generating portion toward the second magnetic field generating portion, the magnetic element of the magnetic field detecting portion is magnetized in a direction (an orientation) from the other end portion toward the one end portion of the magnetic field detecting portion in the longitudinal direction. As described above, when one of the first supporting member and the second supporting member is rotated, the magnetic element of the magnetic field detecting portion is magnetized in the different directions. Accordingly, it is possible to detect the rotation of the first supporting member or the second supporting member according to the change in the direction of the magnetization of the magnetic element of the magnetic field detecting portion.

As described above, according to the first aspect of the present invention, the first magnetic member is arranged to cover the one end portion of the magnetic field detecting portion in the longitudinal direction, and the second magnetic member is arranged to cover the other end portion of the magnetic field detecting portion in the longitudinal direction. Further, the first magnetic member is arranged to face the second magnetic member at the center portion of the magnetic field detecting portion, but does not contact with the second magnetic member. When the first magnetic member and the second magnetic member are arranged such a way, the magnetic field generated from the first magnetic field generating portion toward the second magnetic field generating portion is induced in the following manner.

That is, according to the first aspect of the present invention, when one of the first supporting member and the second supporting member is rotated, the first magnetic field generating portion approaches the one end portion of the magnetic field detecting portion in the longitudinal direction, and the second magnetic field generating portion approaches the other end portion of the magnetic field detecting portion in the longitudinal direction. At this moment, the first magnetic member is situated between the first magnetic field generating portion and the one end portion of the magnetic field detecting portion, and the second magnetic member is situated between the second magnetic field generating portion and the other end portion of the magnetic field detecting portion.

As a result, most of magnetic flux generated with the first magnetic field generating portion and the second magnetic field generating portion proceeds from the first magnetic field generating portion into the first magnetic member, not the one end portion of the magnetic field detecting portion. Further, after entering the first magnetic member, the magnetic flux passes through the first magnetic member toward the second magnetic member. As described above, the first magnetic member is arranged to face the second magnetic member at the center portion of the magnetic field detecting portion with a space in between. Accordingly, after passing through the first magnetic member, the magnetic flux approaches the second magnetic member, but does not directly enter the second magnetic member. Instead, the magnetic flux enters a portion of the magnetic field detecting portion near the one end portion thereof at the center portion of the magnetic field detecting portion.

After entering the portion of the magnetic field detecting portion near the one end portion thereof at the center portion of the magnetic field detecting portion, the magnetic flux proceeds through the magnetic field detecting portion toward the other end portion thereof. After passing through the center portion of the magnetic field detecting portion in the longitudinal direction, the magnetic flux reaches another portion of the magnetic field detecting portion near the other end portion thereof at the center portion of the magnetic field detecting portion. After reaching another portion of the magnetic field detecting portion near the other end portion thereof at the center portion of the magnetic field detecting portion, the magnetic flux moves away from the magnetic field detecting portion and passes through the second magnetic member toward the second magnetic field generating portion. Afterwards, the magnetic flux reaches the second magnetic field generating portion from the second magnetic member.

On the other hand, in another occasion, when one of the first supporting member and the second supporting member is rotated, the first magnetic field generating portion approaches the other end portion of the magnetic field detecting portion in the longitudinal direction, and the second magnetic field generating portion approaches the one end portion of the magnetic field detecting portion in the longitudinal direction. As a result, the magnetic field is generated from the first magnetic field generating portion toward the second magnetic field generating portion through a path opposite to the path described above. That is, most of the magnetic flux generated with the first magnetic field generating portion and the second magnetic field generating portion proceeds from the first magnetic field generating portion to the second magnetic field generating portion through the second magnetic member, the center portion of the magnetic field detecting portion, and the first magnetic member.

As described above, according to the first aspect of the present invention, the first magnetic member and the second magnetic member induce the magnetic filed in the specific direction. Accordingly, most of the magnetic flux proceeding from the first magnetic field generating portion to the second magnetic field generating portion passes through the center portion of the magnetic field detecting portion. As a result, when the first magnetic field generating portion approaches the one end portion (or the other end portion) of the magnetic field detecting portion, and the second magnetic field generating portion approaches the other end portion (or the one end portion) of the magnetic field detecting portion, the magnetic flux tends to have a high density at the center portion of the magnetic field detecting portion. Further, when the first magnetic field generating portion moves away from the one end portion (or the other end portion) of the magnetic field detecting portion, and the second magnetic field generating portion moves away from the other end portion (or the one end portion) of the magnetic field detecting portion, the magnetic flux tends to have a low density at the center portion of the magnetic field detecting portion.

On the other hand, regardless of the cases that the first magnetic field generating portion approaches or moves away from the one end portion (or the other end portion) of the magnetic field detecting portion, and the second magnetic field generating portion approaches or moves away from the other end portion (or the one end portion) of the magnetic field detecting portion, the magnetic flux tends to have a significantly small change in the density thereof at the one end portion and the other end portion of the magnetic field detecting portion as opposed to the center portion of the magnetic field detecting portion.

Accordingly, only when the first magnetic field generating portion approaches or moves away from the one end portion (or the other end portion) of the magnetic field detecting portion, and the second magnetic field generating portion approaches or moves away from the other end portion (or the one end portion) of the magnetic field detecting portion, it is possible to change the orientation of the magnetization of the magnetic element. In other cases, it is possible to prevent the orientation of the magnetization of the magnetic element from changing. As a result, it is possible to prevent the unpredictable change in the orientation of the magnetization of the magnetic element constituting the magnetic field detecting portion, thereby making it possible to accurately detect the rotation of the detection subject.

According to a second aspect of the present invention, in the rotation detecting device in the first aspect, the first magnetic member may extend from the one end portion of the magnetic field detecting portion toward an inner circumference and an outer circumference of the second supporting member, so that the first magnetic member covers the second supporting member on an inner circumference side and an outer circumference side of the one end portion of the magnetic field detecting portion. Further, the second magnetic member may extend from the other end portion of the magnetic field detecting portion toward the inner circumference and the outer circumference of the second supporting member, so that the second magnetic member covers the second supporting member on an inner circumference side and an outer circumference side of the other end portion of the magnetic field detecting portion.

According to the second aspect of the present invention, the first magnetic member covers the large area including the one end portion of the magnetic field detecting portion, and the second magnetic member covers the large area including the other end portion of the magnetic field detecting portion. Accordingly, when the first magnetic field generating portion approaches the one end portion of the magnetic field detecting portion, and the second magnetic field generating portion approaches the other end portion of the magnetic field detecting portion, it is possible to effectively induce the magnetic field generated with the first magnetic field generating portion and the second magnetic field generating portion toward the center portion of the magnetic field detecting portion.

Further, when the first magnetic field generating portion is situated away from the one end portion of the magnetic field detecting portion, and the second magnetic field generating portion is situated away from the other end portion of the magnetic field detecting portion, it is possible to prevent the magnetic field generated with the first magnetic field generating portion and the second magnetic field generating portion from entering the magnetic field detecting portion. Accordingly, it is possible to prevent the unpredictable change in the orientation of the magnetization of the magnetic element constituting the magnetic field detecting portion.

According to a third aspect of the present invention, in the rotation detecting device in the first aspect or the second aspect, the first magnetic member may include a first edge surface facing a second edge surface of the second magnetic member at the center portion of the magnetic field detecting portion. The first edge surface and the second edge surface may extend in a direction perpendicular to the axial line and the longitudinal direction of the magnetic field detecting portion.

According to the third aspect of the present invention, when one of the first supporting member and the second supporting member is rotated, and the first magnetic field generating portion and the second magnetic field generating portion approach the one end portion and the other end portion of the magnetic field detecting portion, it is possible to reduce dispersion of the magnetic field proceeding from the first magnetic field generating portion to the second magnetic field generating portion. Further, it is possible to direct the magnetic field in the direction in parallel to the longitudinal direction of the magnetic field detecting portion.

In particular, when the first magnetic member includes the first edge surface facing the second edge surface of the second magnetic member at the center portion of the magnetic field detecting portion, and the magnetic field proceeds from the first edge surface toward an outside of the first magnetic member, or from the second edge surface toward an outside of the second magnetic member, it is possible to reduce dispersion of the magnetic field. Accordingly, it is possible to stably maintain the high density of the magnetic flux at the center portion of the magnetic field detecting portion. As a result, when the first magnetic field generating portion and the second magnetic field generating portion move close to and move away from the one end portion and the other end portion of the magnetic field detecting portion, it is possible to increase and stabilize the change in the density of the magnetic flux at the center portion of the magnetic field detecting portion caused.

According to a fourth aspect of the present invention, in the rotation detecting device in one of the first aspect to the third aspect, the first magnetic member may include a third edge surface facing the axial line, and the third edge surface may extend in a direction in parallel to the longitudinal direction of the magnetic field detecting portion. Further, the second magnetic member may include a fourth edge surface facing the axial line, and the fourth edge surface may extend in a direction in parallel to the longitudinal direction of the magnetic field detecting portion.

According to the fourth aspect of the present invention, when one of the first supporting member and the second supporting member is rotated, and the first magnetic field generating portion and the second magnetic field generating portion approach the one end portion and the other end portion of the magnetic field detecting portion, it is possible to reduce dispersion of the magnetic field proceeding from the first magnetic field generating portion to the second magnetic field generating portion.

In particular, in the first magnetic member and the second magnetic member, it is possible to prevent the magnetic field from dispersing from the third edge surface and the fourth edge surface facing the axial line toward an outside thereof. Accordingly, it is possible to stably maintain the high density of the magnetic flux at the center portion of the magnetic field detecting portion. As a result, when the first magnetic field generating portion and the second magnetic field generating portion move close to and move away from the one end portion and the other end portion of the magnetic field detecting portion, it is possible to increase and stabilize the change in the density of the magnetic flux at the center portion of the magnetic field detecting portion caused.

According to a fifth aspect of the present invention, in the rotation detecting device in one of the first aspect to the fourth aspect, the first magnetic member may be arranged to cover an edge surface of the one end portion of the magnetic field detecting portion, and the second magnetic member may be arranged to cover an edge surface of the other end portion of the magnetic field detecting portion.

According to the fifth aspect of the present invention, when the first magnetic field generating portion and the second magnetic field generating portion approach the one end portion and the other end portion of the magnetic field detecting portion, it is possible to induce the magnetic field generated with the first magnetic field generating portion and the second magnetic field generating portion toward the one end portion and the other end portion of the magnetic field detecting portion, in addition to the center portion of the magnetic field detecting portion.

Accordingly, it is possible to increase the density of the magnetic flux at the both end portions of the magnetic field detecting portion in addition to the center portion thereof. Further, it is possible to alien the orientation of the magnetization of the magnetic field detecting portion as a whole with the orientation of the magnetic field generated with the first magnetic field generating portion and the second magnetic field generating portion. Accordingly, it is possible to increase an output level of an electric signal (a detection signal) output from the coil, thereby making it possible to accurately detect the change in the orientation of the magnetization of the magnetic element constituting the magnetic field detecting portion.

On the other hand, when the first magnetic field generating portion and the second magnetic field generating portion are situated away from the one end portion and the other end portion of the magnetic field detecting portion, it is possible to prevent the magnetic field generated with the first magnetic field generating portion and the second magnetic field generating portion from entering the magnetic field detecting portion. As a result, it is possible to prevent the unpredictable change in the orientation of the magnetization of the magnetic element constituting the magnetic field detecting portion According to a sixth aspect of the present invention, in the rotation detecting device in one of the first aspect to the fifth aspect, each of the magnetic field generating portions may be formed of a permanent magnet. Further, each of the magnetic field generating portions may have a length along the circumferential direction or the tangential direction of the circumference greater than the space between the edge surfaces of the first magnetic member and the second magnetic member facing each other at the center portion of the magnetic field detecting portion in the longitudinal direction.

According to the sixth aspect of the present invention, when one of the first supporting member and the second supporting member is rotated, and the first magnetic field generating portion and the second magnetic field generating portion approach the center portion of the magnetic field detecting portion, it is possible to prevent the magnetic field generated with the first magnetic field generating portion and the second magnetic field generating portion from entering the magnetic field detecting portion.

More specifically, each of the magnetic field generating portions has a length along the circumferential direction or the tangential direction of the circumference greater than the space between the edge surfaces of the first magnetic member and the second magnetic member facing each other at the center portion of the magnetic field detecting portion in the longitudinal direction. Accordingly, for example, when the first magnetic field generating portion approaches the center portion of the magnetic field detecting portion, a distance between the first magnetic field generating portion and the first magnetic member or the second magnetic member becomes smaller than a distance between the first magnetic field generating portion and the center portion of the magnetic field detecting portion. Accordingly, most of the magnetic flux proceeding from the first magnetic field generating portion to the second magnetic field generating portion enters the first magnetic member or the second magnetic member. As a result, most of the magnetic flux does not enter the magnetic field detecting portion.

Similarly, when the second magnetic field generating portion approaches the center portion of the magnetic field detecting portion, most of the magnetic flux proceeding from the first magnetic field generating portion to the second magnetic field generating portion enters the first magnetic member or the second magnetic member. As a result, most of the magnetic flux does not enter the magnetic field detecting portion. In sum, when the first magnetic member or the second magnetic field generating portion approaches the center portion of the magnetic field detecting portion, it is possible to prevent the orientation of the magnetization of the magnetic element constituting the magnetic field detecting portion from changing.

According to a seventh aspect of the present invention, in the rotation detecting device in one of the first aspect to the sixth aspect, the magnetic field detecting portion may include the magnetic element formed of a large Barkhausen element.

According to the seventh aspect of the present invention, when the first magnetic field generating portion and the second magnetic field generating portion apply the magnetic field to the magnetic element, the orientation of the magnetization of the magnetic element is rapidly changed. Accordingly, the rapid change generates an electromotive force, so that an electrical signal having a pulse wave shape rising rapidly flows through the coil. As a result, it is possible to obtain the electrical signal having the pulse wave shape as the detection signal corresponding to the change in the orientation of the magnetization of the magnetic element. Therefore, it is possible to accurately and easily detect the rotation of the first supporting member or the second supporting member.

According to an eighth aspect of the present invention, in the rotation detecting device in one of the first aspect to the seventh aspect, the magnetic field detecting portion may include three magnetic field detecting portions each arranged along the circumferential direction of the axial line. Each of the three magnetic field detecting portions is provided with the first magnetic member and the second magnetic member. Further, among the first magnetic members and the second magnetic members, each pair of the first magnetic member and the second magnetic member arranged adjacent to each other along the circumferential direction are situated close to each other. Accordingly, the first magnetic members and the second magnetic members are arranged in a continuous arrangement to cover along a substantially entire circumference on the outer circumferential side of the second supporting member facing the first supporting member while each of three magnetic field detecting portions are situated between the second supporting member, and the first magnetic members and the second magnetic members.

According to the eighth aspect of the present invention, the first magnetic members and the second magnetic members are arranged in the continuous arrangement to cover along the substantially entire circumference on the outer circumferential side of the second supporting member facing the first supporting member. Accordingly, it is possible to reduce the magnetic force between the magnetic field detecting portions and the magnetic field generating portions. Further, it is possible to obtain the magnetic force uniformly along the circumferential direction. As a result, it is possible to prevent cogging when one of the first supporting member and the second supporting member is rotated.

According to the present invention, it is possible to prevent the unpredictable change in the orientation of the magnetization of the magnetic element constituting the magnetic field detecting portion. Further, it is possible to reduce a size of the rotation detecting device in the axial line direction.

DETAILED DESCRIPTION OF THE PREFERRED EMBODIMENTS

Hereunder, referring to the accompanying drawings, preferred embodiments of the present invention will be described.

First Embodiment

Figure 1:
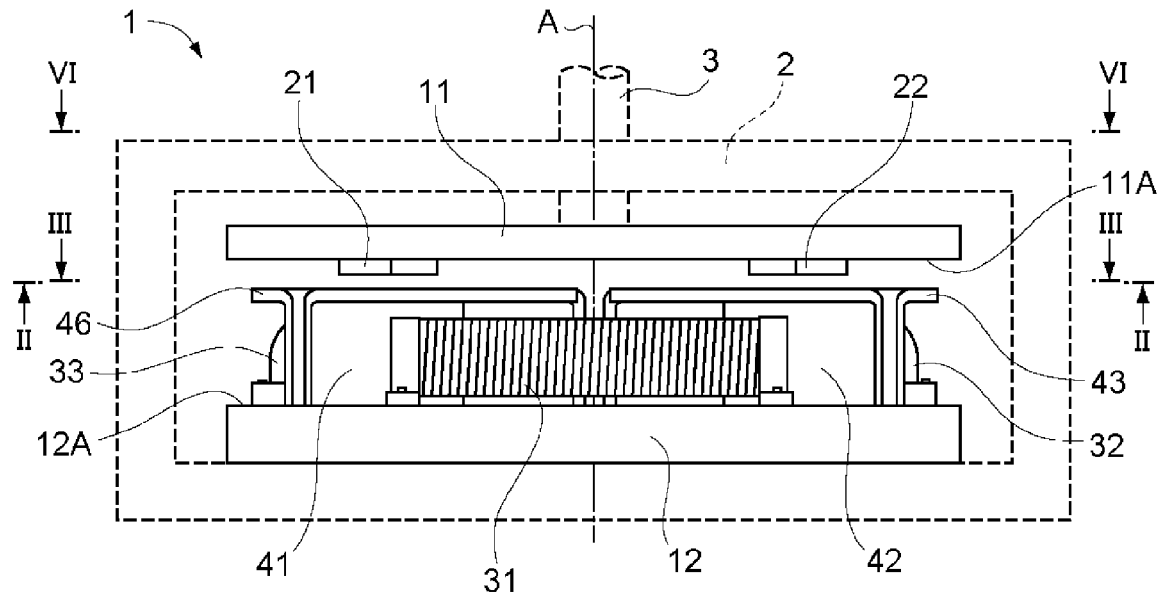
FIG. 1 is a schematic side view showing a configuration of a rotation detecting device according to a first embodiment of the present invention.

A first embodiment of the present invention will be explained. FIG. 1 is a schematic side view showing a configuration of a rotation detecting device 1 according to the first embodiment of the present invention. In the first embodiment, the rotation detecting device 1 is a device capable of detecting a rotation status of a detection object such as a number of rotations and a direction of the rotation of the detection object.

In the first embodiment, a first supporting member 11 and a second supporting member 12 are held in a housing 2 of the rotation detecting device 1. For example, the housing 2 is formed to be a cylindrical shape having a lid, and the first supporting member 11 and the second supporting member 12 have disk shapes, respectively. The first supporting member 11 and the second supporting member 12 are positioned in the housing 2, so that respective centers thereof are penetrated by an axial line A. Further, the first supporting member 11 and the second supporting member 12 are situated so as to be separated from each other in an extending direction of the axial line A or a direction of the axis. A surface 11A of the first supporting member 11 faces the second supporting member 12, being perpendicular to the axial line A. Further, a surface 12A of the second supporting member 12 faces the first supporting member 11, being perpendicular to the axial line A.

In the first embodiment, the first supporting member 11 is capable of rotating around the axial line A while the second supporting member 12 is fixed to the housing 2 and not capable of rotating. Further, a shaft 3 is attached to the housing 2 so as to be capable of rotating. The shaft 3 is capable of rotating around the axial line A. One end portion of the shaft 3 is connected to the object to be detected (not shown) and another end portion of the shaft 3 is connected to the first supporting member 11 in the housing 2. Therefore, when the detection object is rotated, the rotation is transmitted to the first supporting member 11 through the shaft 3. As a result, the first supporting member 11 is rotated in the housing 2.

Figure 2:
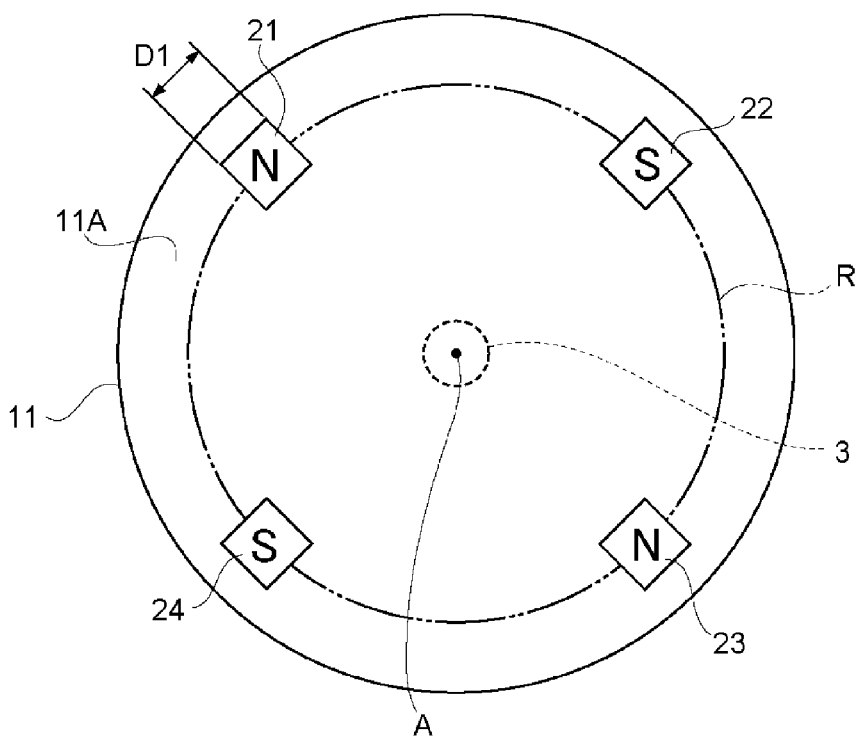
FIG. 2 is a schematic plan view showing a first supporting member and magnets of the rotation detecting device viewed from arrows II-II in FIG. 1 according to the first embodiment of the present invention.

FIG. 2 is a schematic plan view showing the first supporting member 11 and four magnets 21, 22, 23, and 24 disposed on the first supporting member 11 of the rotation detecting device 1, being viewed from an arrow II in FIG. 1. As shown in FIG. 2, the magnets 21, 22, 23 and 24 are provided on the first supporting member 11 as four magnetic field generating portions. For example, the magnets 21, 22, 23 and 24 are permanent magnets with plate shapes. The magnets 21, 22, 23 and 24 are fixed to the surface 11A of the first supporting member 11. On the surface 11A, the magnets 21, 22, 23 and 24 are arranged around the axial line A, so as to be apart from each other in a circumferential direction. Further, the magnets 21, 22, 23 and 24 are arranged so as to have an equal interval in the circumferential direction. Further, the magnets 21, 22, 23 and 24 are arranged to have 90 degree angle next to each other. The magnets 21, 22, 23 and 24 are arranged so as to have different polarities alternately in the circumferential direction. Further, the magnets 21, 22, 23 and 24 are arranged such that the respective polarities of surfaces thereof facing the second supporting member 12 become N, S, N and S.

In the first embodiment, the magnets 21, 22, 23 and 24 generate a magnetic field in a region between the first supporting member 11 and the second supporting member 12. In addition, as shown in FIG. 2, a circle R having a center on the axial line A and overlapping with respective magnets 21, 22, 23 and 24 is shown with a dotted line. When the first supporting member 11 is rotated, the magnets 21, 22, 23 and 24 are rotated on a path corresponding to the circle R. Further, as shown in FIG. 2, the magnet 21 has a predetermined dimension D1 in the circumferential direction (a dimension D1 in a direction of a tangential line of the circle R, which overlaps with a center of the magnet 21). Similarly, each of the magnets 22, 23 and 24 has the same dimension in the circumferential direction as the predetermined dimension D1 of the magnet 21.

Figure 3:
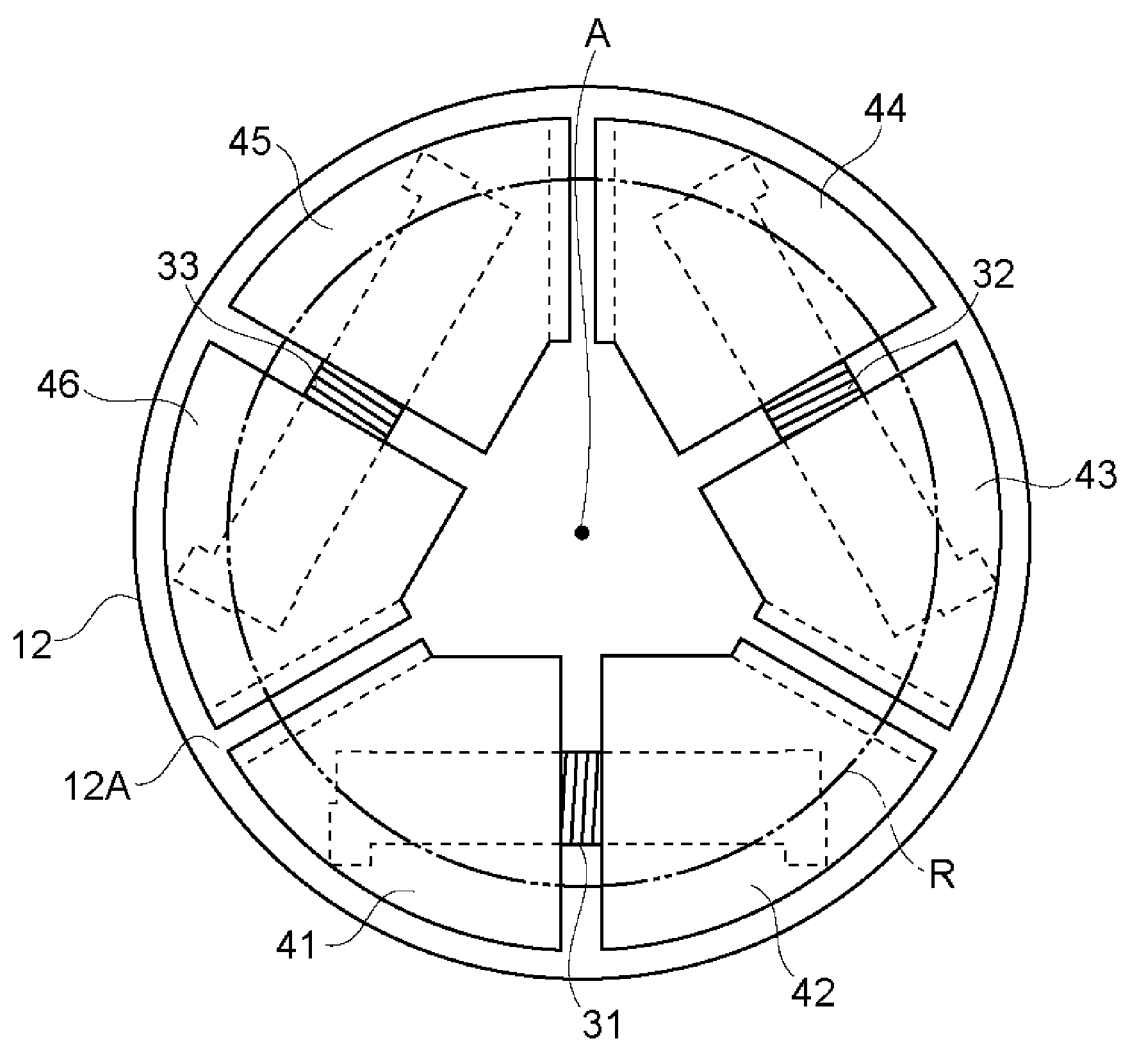
FIG. 3 is a schematic plan view showing a second supporting member, magnetic field detecting portions, and magnetic members of the rotation detecting device viewed from arrows III-III in FIG. 1 according to the first embodiment of the present invention.

FIG. 3 is a schematic plan view showing the second supporting member 12, three magnetic field detecting portions 31, 32, and 33 disposed on the second supporting member 12 and magnetic members 41 to 46 each for covering an end portion of each of the magnetic field detecting portions 31, 32, and 33 of the rotation detecting device 1, being viewed from a direction of an arrow III in FIG. 3.

Figure 4:
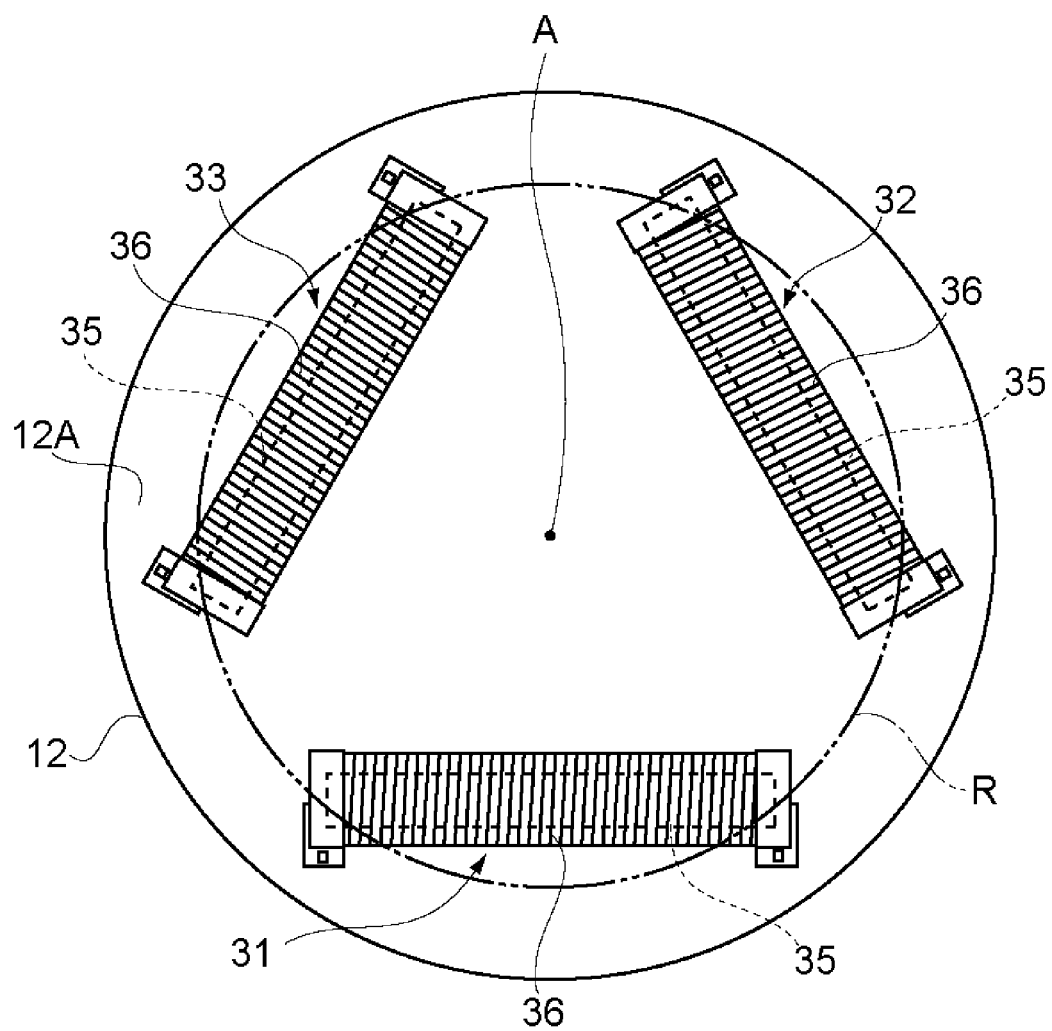
FIG. 4 is a schematic plan view showing the second supporting member and the magnetic field detecting portions of the rotation detecting device without the magnetic members according to the first embodiment of the present invention.
Figure 5:
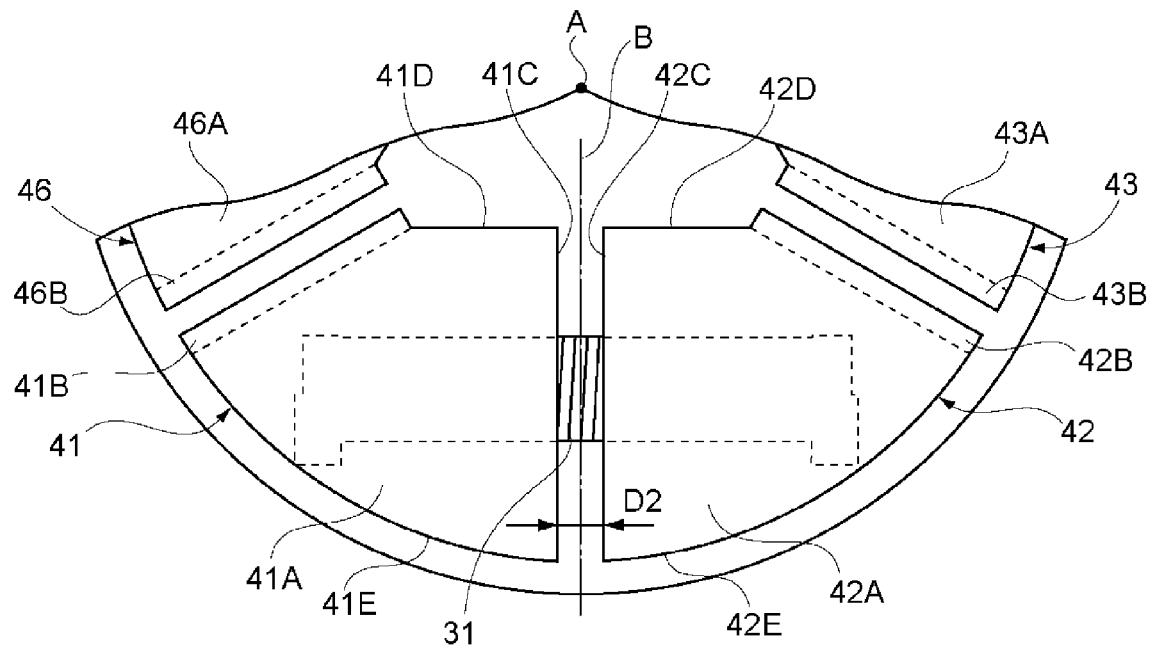
FIG. 5 is an enlarged schematic plan view showing the second supporting member and the magnetic field detecting portion of the rotation detecting device according to the first embodiment of the present invention.

FIG. 4 is a schematic plan view showing a state that the magnetic members 41 to 46 are removed from the structure shown in FIG. 3. FIG. 5 is an enlarged plan view showing a portion of the second supporting member 12, the magnetic field detecting portion 31 and a pair of the magnetic members 41 and 42 for covering the magnetic field detecting portion 31, which are shown in FIG. 3.

As shown in FIG. 4, the three magnetic field detecting portions 31, 32 and 33 are provided on the second supporting member 12. Each of the magnetic field detecting portions 31, 32 and 33 is formed of a magnetic element 35 having a wire shape or a strip plate shape and a coil 36 wound around the magnetic element 35. The magnetic field detecting portions 31, 32 and 33 are fixed to the surface 12A of the second supporting member 12. On the surface 12A, the magnetic field detecting portions 31, 32 and 33 are arranged around the axial line A, so as to be apart from each other in the circumferential direction.

In the first embodiment, the magnetic field detecting portions 31, 32 and 33 are arranged so as to have an equal interval in the circumferential direction. Further, the magnetic field detecting portions 31, 32 and 33 are arranged to have 120 degree angle next to each other. Further, the magnetic field detecting portion 31 is situated such that a longitudinal direction of the magnetic element 35 and the tangential line of the circle R (the tangential line at a point where the circle R crosses a line connecting a point on the axial line A and a midpoint of the magnetic element 35 in the longitudinal direction) are parallel with each other. Similarly, each of the magnetic field detecting portions 32 and 33 are situated such that the longitudinal direction of the magnetic elements 35 and the tangential line of the circle R become parallel with each other.

Furthermore, the magnetic field detecting portions 31, 32 and 33 are situated such that end portions of the magnetic elements 35 thereof overlap with the circle R. Further, the magnetic field detecting portions 31, 32 and 33 are arranged such that a distance from one of the end portions (one end portion) of the magnetic element 35 thereof to the axial line A is equal to a distance from the other of the end portions (the other end portion) of the magnetic element 35 thereof to the axial line A. In addition, each of the magnetic field detecting portions 31, 32 and 33 detects the magnetic field generated by the magnets 21, 22, 23 and 24.

In the first embodiment, each of the magnetic field detecting portions 31, 32 and 33 includes a composite magnetic wire as a magnetic element. Generally, the composite magnetic wire is a ferromagnetic material having a fine wire shape. The composite magnetic wire is formed of a compound magnetic material with a uniaxial anisotropy having a unique character that an orientation of magnetization thereof is changed by applying a relatively small external magnetic field at an outer circumferential portion thereof, while the orientation of magnetization thereof is not changed without applying a relatively strong external magnetic field at a center portion thereof.

When the external magnetic field which is relatively strong enough to reverse the orientation of magnetization at the center portion of the composite magnetic wire is applied to the composite magnetic wire in a direction parallel with a longitudinal direction of the composite magnetic wire, the composite magnetic wire has the same orientation of magnetization at both of the center portion and the outer circumferential portion thereof. When the external magnetic field which is relatively small enough to reverse the orientation of magnetization only at the outer circumferential portion of the composite magnetic wire is subsequently applied to the composite magnetic wire in an opposite direction, the orientation of magnetization is changed only at the outer circumferential portion and the orientation of magnetization is not changed at the center portion of the composite magnetic wire. Consequently, the composite magnetic wire has different orientations of magnetization at the center portion and the outer circumferential portion thereof, respectively. The state described above is maintained even if the external magnetic field is removed.

When the outer circumferential portion and the center portion of the composite magnetic wire have the orientations of magnetization being opposite to each other, the external magnetic field is applied to the composite magnetic wire in the same direction with the orientation of magnetization of the center portion. When the external magnetic field being applied is small at the beginning and is increased gradually, a large Barkhausen effect is generated. As a result, the orientation of magnetization is rapidly reversed at the outer circumferential portion of the composite magnetic wire. Further, for example, an electrical signal of a pulse wave having a sharp forward wave in a positive direction is output from the coil wound around the composite magnetic wire by an electromotive force generated upon the rapid reverse of the orientation of magnetization of the composite magnetic wire.

Furthermore, when the outer circumferential portion and the center portion of the composite magnetic wire have the same directions of magnetization, the external magnetic field is applied to the composite magnetic wire in the opposite direction to the orientation of magnetization. When the external magnetic field being applied is small at the beginning and is increased gradually, the orientation of magnetization is rapidly reversed at the outer circumferential portion of the composite magnetic wire as the external magnetic field becomes stronger than a specific point. Further, for example, the electrical signal of the pulse wave having the sharp forward wave in a negative direction is output from the coil wound around the composite magnetic wire by the electromotive force generated upon the rapid reverse of the orientation of magnetization of the composite magnetic wire.

In the magnetic field detecting portions 31, 32 and 33 having the composite magnetic wire described above as the magnetic element 35, a detection signal which is the electrical signal having the pulse wave is output from the coil 36 wound around the magnetic element 35 as the external magnetic field is applied to the magnetic element 35 and the orientation of magnetization of an outer circumferential portion of the magnetic element 35 is changed. In the rotation detecting device 1, the magnetic field generated by the magnets 21 and 22, the magnetic field generated by the magnets 22 and 23, the magnetic field generated by the magnets 23 and 24, and the magnetic field generated by the magnets 24 and 21 are applied to the magnetic element 35 as the external magnetic field. As focusing on any one of the magnetic elements 35, the four magnetic fields are sequentially applied to the magnetic element 35 as the first supporting member 11 is rotated.

In the first embodiment, the four magnetic fields are not strong enough to change the orientation of magnetization at both of the outer circumferential portion and the center portion of the magnetic element 35 but as strong as changing the orientation of magnetization only at the outer circumferential portion of the magnetic element 35. According to positions of the magnetic element 35 and the magnets 21, 22, 23 and 24, a direction of the magnetic field is changed as the magnetic field being applied to the magnetic element 35 is changed. Therefore, the magnetic element 35 changes the orientation of magnetization thereof at the outer circumferential portion thereof as the magnetic field is changed. Accordingly, the detection signal is output from the coil 36 wound around the magnetic element 35.

Further, in the rotation detecting device 1, the magnets 21, 22, 23 and 24 are arranged to have 90 degree angle next to each other while the magnetic field detecting portions 31, 32 and 33 are arranged to have 120 degree angle next to each other. Therefore, the magnetic field detecting portions 31, 32 and 33 output the detection signal with different timing while the first supporting member 11 rotates. It is possible to detect the number of rotations and the direction of the rotation of the object to be detected by performing a predetermined process as utilizing the detection signal output with the different timing from the magnetic field detecting portions 31, 32 and 33.

The magnetic members 41 and 42 will be explained next in more detail. As shown in FIG. 5, the magnetic members 41 and 42 are formed of a magnetic material, for example, iron and the like. The magnetic members 41 and 42 are arranged on the surface of the second supporting member 12 and fixed to the second supporting member 12. Further, the magnetic field detecting portion 31 and the magnetic members 41 and 42 do not contact each other. Furthermore, the magnetic member 41 contacts neither of other magnetic members 42, 43, 44, 45 or 46. In addition, the magnetic member 42 contacts neither of other magnetic members 41, 43, 44, 45 or 46.

In the first embodiment, the magnetic member 41 includes a flat plate portion 41A and a side plate portion 41B. The flat plate portion 41A is situated above the magnetic field detecting portion 31 and covers one of the end portions (the one end portion) in the longitudinal direction of the magnetic field detecting portion 31 and extends in parallel with the surface 12A of the second supporting member 12 or the surface 11A of the first supporting member 11. The flat plate portion 41A covers the first end portion of the magnetic field detecting portion 31, which faces the first supporting member 11.

Further, the flat plate portion 41A extends from a point thereof corresponding to the first end portion of the magnetic field detecting portion 31 to both of an inner and an outer circumference of the second supporting member 12. Accordingly, the flat plate portion 41A covers the second supporting member 12, widely through both of the inner and the outer circumferences relative to the first end portion of the magnetic field detecting portion 31.

In the first embodiment, the side plate portion 41B is formed by bending one end portion of the flat plate portion 41A toward the second supporting member 12. The side plate portion 41B covers an edge surface (a left edge surface in FIG. 5) of the first end portion of the magnetic field detecting portion 31. The side plate portion 41B is perpendicular to the surface 12A of the second supporting member 12 and the flat plate portion 41A. Further, a lower end portion of the side plate portion 41B is fixed to the second supporting member 12. Thereby, the magnetic member 41 is fixed to the second supporting member 12.

As shown in FIG. 5, the magnetic members 41 and 42 are configured to be symmetrical about a line B. Similar to the magnetic member 41, the magnetic member 42 includes a flat plate portion 42A and a side plate portion 42B. The flat plate portion 42A covers the other end portion of the magnetic field detecting portion 31, which faces the first supporting member 11. Further, the flat plate portion 42A extends from a point thereof corresponding to the second end portion of the magnetic field detecting portion 31 to both of an inner and an outer circumference of the second supporting member 12. Accordingly, the flat plate portion 42A covers the second supporting member 12, widely through both of the inner and the outer circumferences relative to the second end portion of the magnetic field detecting portion 31. The side plate portion 42B covers an edge surface (a right edge surface in FIG. 5) of the second end portion of the magnetic field detecting portion 31. Further, a lower end portion of the side plate portion 42B is fixed to the second supporting member 12. Thereby, the magnetic member 42 is fixed to the second supporting member 12.

In addition, the magnetic members 41 and 42 extend toward a center portion of the magnetic field detecting portion 31 in the longitudinal direction, approaching to each other. An opposite edge surface 41C of the magnetic member 41 and an opposite edge surface 42C of the magnetic member 42 face each other with a gap at the center portion of the magnetic field detecting portion 31.

In the first embodiment, the opposite edge surfaces 41C and 42C respectively extend in a direction perpendicular to the axial line A and the longitudinal direction of the magnetic field detecting portion 31. Further, the opposite edge surfaces 41C and 42C extend from the inner circumference to the outer circumference of the second supporting member 12, through a position corresponding to the center portion of the magnetic field detecting portion 31 as maintaining a distance to each other. As shown in FIG. 5, the distance D2 between the opposite edge surfaces 41 and 42 is predetermined. As described later, a dimension D1 of each of the magnets 21, 22, 23 and 24 is configured to be larger than the distance D2 between the opposite edge surfaces 41C and 42C.

Further, an inner circumference side edge surface 41D of the magnetic member 41 faces the axial line A and extends in parallel with the longitudinal direction of the magnetic field detecting portion 31. Similarly, an inner circumference side edge surface 42D of the magnetic member 42 faces the axial line A and extends in parallel with the longitudinal direction of the magnetic field detecting portion 31. On the other hand, an outer circumference side edge surface 41E of the magnetic member 41 and an outer circumference side edge surface 42E of the magnetic member 42 extend having an arc shape along a circumference of the second supporting member 12.

In addition, as shown in FIG. 5, the magnetic members 41 and 42 cover most of a portion facing the first supporting member 11 of the magnetic field detecting portion 31 therewith. A mere portion of the magnetic field detecting portion 31 is exposed toward the first supporting member 11. In the magnetic field detecting portion 31, a region thereof covered with the magnetic members 41 and 42 is larger than a region thereof exposed toward the first supporting member 11.

In the first embodiment, the magnetic members 43 and 44 are configured as the same as the magnetic members 41 and 42. Further, positions of the magnetic members 43 and 44 relative to the magnetic field detecting portion 33 are similar to positions of the magnetic members 41 and 42 relative to the magnetic field detecting portion 31. Furthermore, the magnetic members 45 and 46 are configured as the same as the magnetic members 41 and 42. In addition, positions of the magnetic members 45 and 46 relative to the magnetic field detecting portion 33 are similar to positions of the magnetic members 41 and 42 relative to the magnetic field detecting portion 31.

In addition, as shown in FIG. 3, the magnetic members next to each other in the circumferential direction (41 and 42, 42 and 43, 43 and 44, 44 and 45, 45 and 46, 46 and 41) are close to each other. Therefore, the magnetic members 41 to 46 are arranged so as to serially cover the outer circumference of the surface 12A of the second supporting member 12 from above throughout substantially whole circumference as well as having the magnetic field detecting portions 31, 32 and 33 in between. Accordingly, total region corresponding to the gaps between the magnetic members next to each other next is exceedingly smaller than total region of the flat plate portions 41A to 46A of the magnetic members 41 to 46, at a plain including the surfaces of the flat plate portions 41A to 46A of the magnetic members 41 to 46.

With the magnetic members 41 to 46 arranged serially as described above, it is possible to suppress magnetic force generated between the magnets 21, 22, 23 and 24 and the magnetic field detecting portions 31, 32 and 33 and uniform the magnetic force in the circumference direction. Thereby, it is possible to suppress cogging as the first supporting member 11 is rotated.

Figure 6:
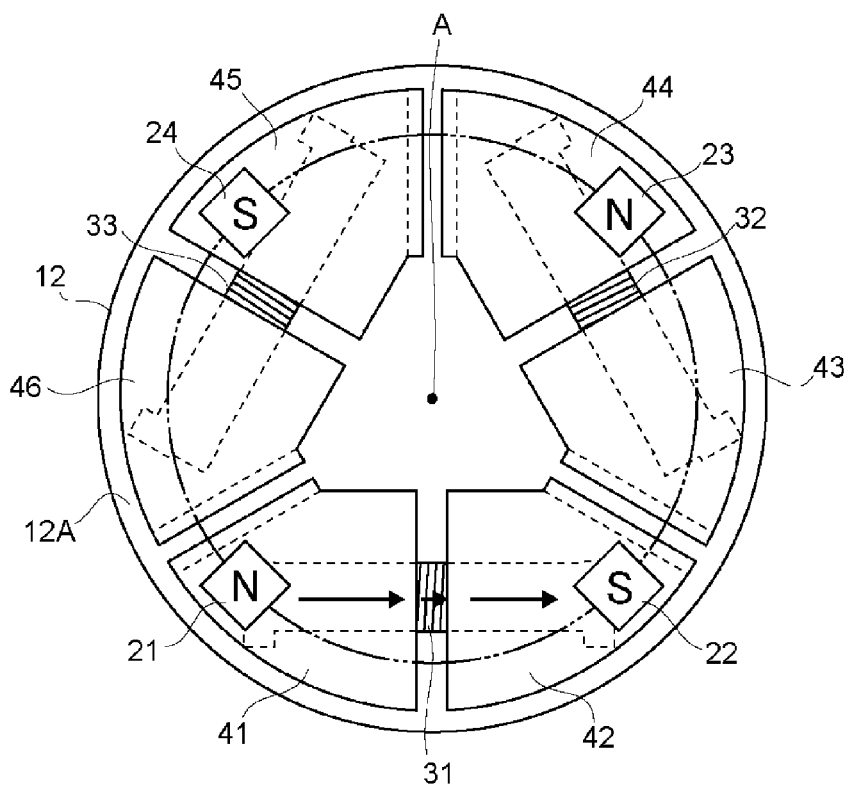
FIG. 6 is a schematic plan view No. 1 showing an operation of the rotation detecting device viewed from arrows VI-VI in FIG. 1 according to the first embodiment of the present invention.
Figure 7:
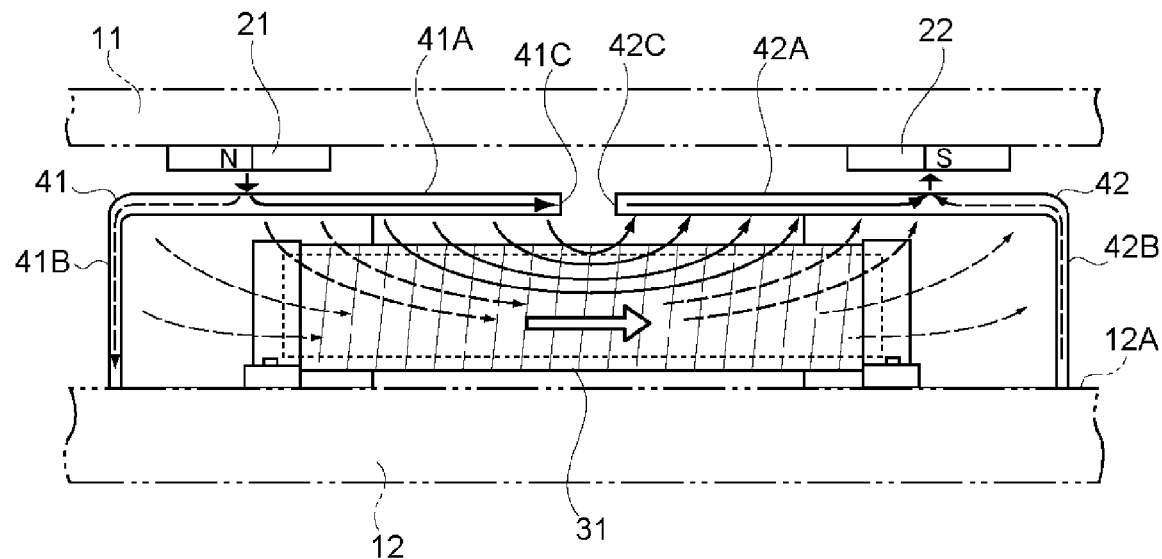
FIG. 7 is a schematic side view No. 1 showing a path of a magnetic field of the rotation detecting device according to the first embodiment of the present invention.
Figure 8:
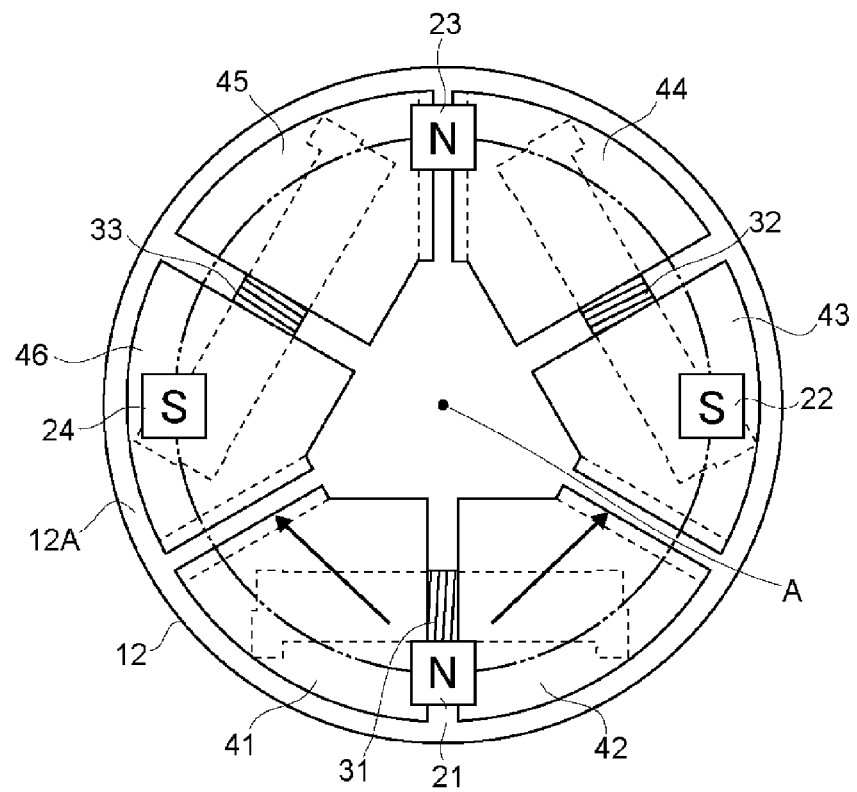
FIG. 8 is a schematic plan view No. 2 showing the operation of the rotation detecting device viewed from arrows VI-VI in FIG. 1 according to the first embodiment of the present invention.

FIG. 6 is a schematic plan view No. 1 showing an operation of the rotation detecting device 1 viewed from arrows VI-VI in FIG. 1 according to the first embodiment of the present invention. FIG. 7 is a schematic side view No. 1 showing a path of a magnetic field of the rotation detecting device 1 according to the first embodiment of the present invention. FIG. 8 is a schematic plan view No. 2 showing the operation of the rotation detecting device 1 viewed from arrows VI-VI in FIG. 1 according to the first embodiment of the present invention.

Figure 9:
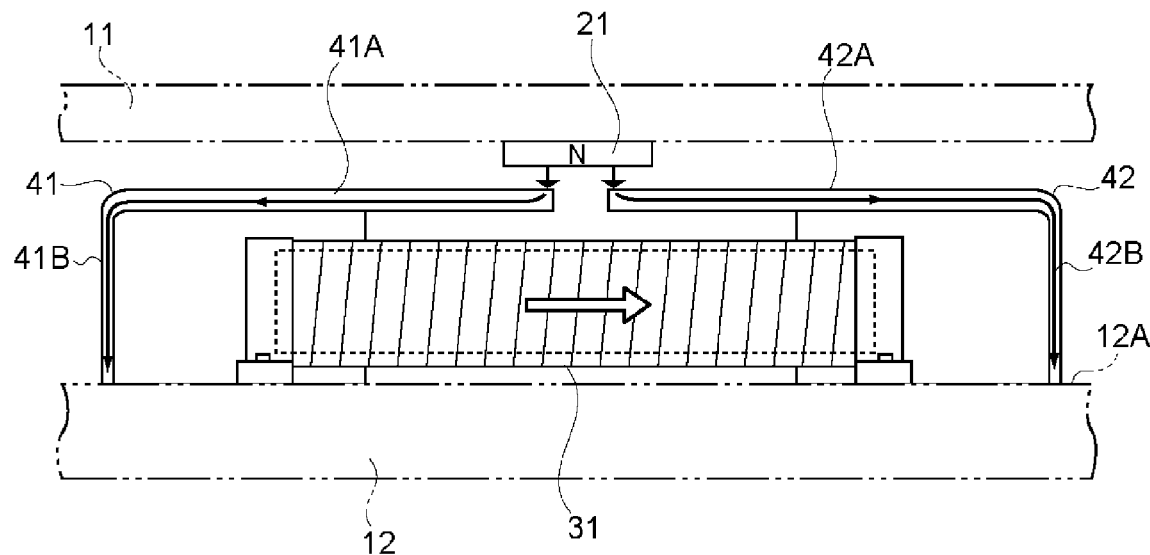
FIG. 9 is a schematic side view No. 2 showing the path of the magnetic field of the rotation detecting device according to the first embodiment of the present invention.
Figure 10:
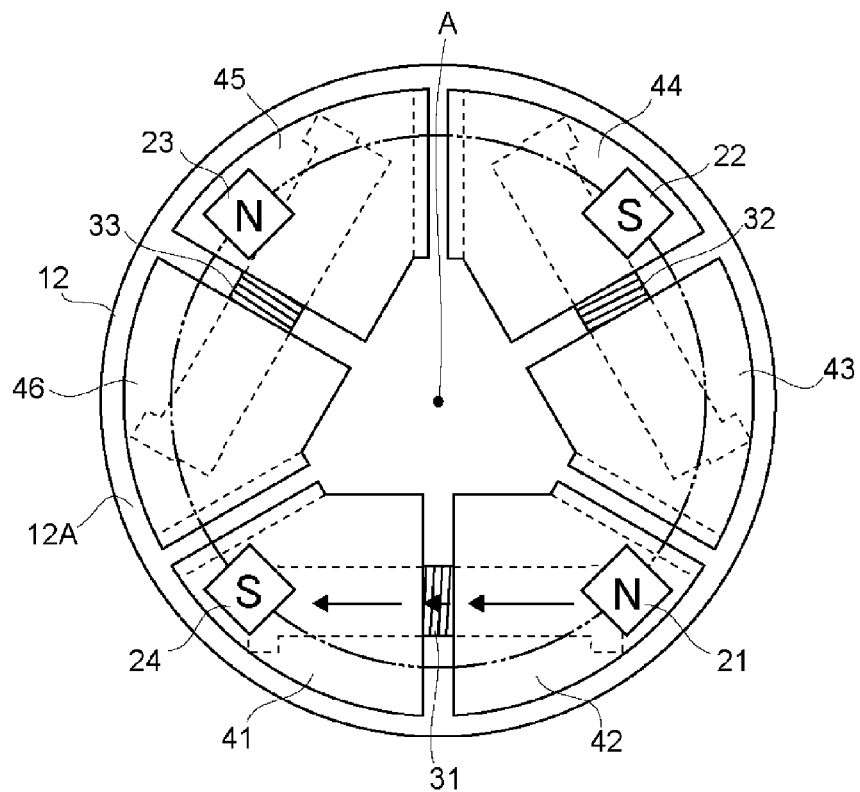
FIG. 10 is a schematic plan view No. 3 showing the operation of the rotation detecting device viewed from arrows VI-VI in FIG. 1 according to the first embodiment of the present invention.

FIG. 9 is a schematic side view No. 2 showing the path of the magnetic field of the rotation detecting device 1 according to the first embodiment of the present invention. FIG. 10 is a schematic plan view No. 3 showing the operation of the rotation detecting device 1 viewed from arrows VI-VI in FIG. 1 according to the first embodiment of the present invention.

FIGS. 6 to 10 show the operation of the rotation detecting device 1. In FIGS. 6, 8, 10, the rotation detecting device 1 being viewed from a direction of the arrows VI is shown, omitting the housing 2, the shaft 3 and the first supporting member 11 for purpose of illustration.

First, a basic operation of the rotation detecting device 1 will be explained with reference to FIGS. 6 to 10. When the magnets 21, 22, 23 and 24 are rotated clockwise or counter clockwise with a first supporting member 11 as the object to be detected is rotated, the magnetic field generated by the magnets 21, 22, 23 and 24 between the first supporting member 11 and the second supporting member 12 are rotated.

In the first embodiment, the magnetic field detecting portions 31, 32 and 33 stand still in the magnetic field thus rotated. Therefore, along with the rotation, the magnetic field applied to the magnetic detection portions 31, 32 and 33 changes polarities thereof. Accordingly, the outer circumferential portion of the magnetic element 35 of the magnetic field detecting portions 31, 32 and 33 changes the orientation of magnetization thereof. Thereby, the detection signal having the pulse wave is output from the coil 36. It is possible to detect the number of rotations and the direction of the rotation of the object to be detected, based on the detection signal.

An operation of the magnetic field detecting portion 31 will be explained next in more detail. For example, when the magnetic element 35 of the magnetic field detecting portion 31 is magnetized in the direction from the second end portion to the first end portion thereof, the first supporting member 11 is rotated counter-clockwise. In this case, as shown in FIG. 6, the magnet 21 having the N polarity approaches the first end portion of the magnetic field detecting portion 31 and the magnet 22 having the S polarity approaches the second end portion of the magnetic field detecting portion 31.

Accordingly, the orientation of magnetization of the outer circumferential portion of the magnetic element 35 of the magnetic field detecting portion 31 is reversed due to magnetic field from the magnet 21 to magnet 22. As a result, the magnetic element 35 is magnetized in the direction from the first end portion to the second end portion thereof. Further, since the orientation of magnetization of the magnetic element 35 is reversed, for example, the detection signal of the pulse wave having the sharp forward wave in the positive direction is output from the coil 36 wound around magnetic element 35.

Next, as the first supporting member 11 keeps being rotated counter-clockwise and then the magnet 24 having the S polarity approaches the first end portion of the magnetic field detecting portion 31 and the magnet 21 having the N polarity approaches the second end portion of the magnetic field detecting portion 31 as shown in FIG. 10, the orientation of magnetization of the outer circumferential portion of the magnetic element 35 of the magnetic field detecting portion 31 is reversed due to magnetic field from the magnet 21 to magnet 24. As a result, the magnetic element 35 is magnetized in the direction from the second end portion to the first end portion thereof. Further, since the orientation of magnetization of the magnetic element 35 is reversed, for example, the detection signal of the pulse wave having the sharp forward wave in a negative direction is output from the coil 36 wound around magnetic element 35.

Next, as the first supporting member 11 continues to be rotated, the magnet 23 having the N polarity approaches the first end portion of the magnetic field detecting portion 31 and the magnet 24 having the S polarity approaches the second end portion of the magnetic field detecting portion 31. As a result, the magnetic element 35 of the magnetic field detecting portion 31 is magnetized in the direction from the first end portion to the second end portion thereof and the detection signal of the pulse wave, for example, having the sharp forward wave in the positive direction is output from the coil 36.

Further, as the first supporting member 11 keeps being rotated and the magnet 22 having the S polarity approaches the first end portion of the magnetic field detecting portion 31 and the magnet 23 having the N polarity approaches the second end portion of the magnetic field detecting portion 31, the magnetic element 35 of the magnetic field detecting portion 31 is magnetized in the direction from the second end portion to the first end portion thereof and the detection signal of the pulse wave, for example, having the sharp forward wave in the negative direction is output from the coil 36. The magnetic field detecting portions 32 and 33 operate in the same way with the magnetic field detecting portion 31.

Next, a function of a magnetic field induction by the magnetic members 41 to 46 will be explained with reference to FIGS. 6 to 10. That is, the magnetic members 41 and 42 induce the magnetic field being applied to the magnetic field detecting portion 31 by the magnets 21, 22, 23 and 24 and form the predetermined magnetic path. Further, the magnetic members 43 and 44 induce the magnetic field being applied to the magnetic field detecting portion 32 by the magnets 21, 22, 23 and 24 and form a predetermined magnetic path. Furthermore, the magnetic members 45 and 46 induce the magnetic field being applied to the magnetic field detecting portion 33 by the magnets 21, 22, 23 and 24 and form the predetermined magnetic path.

Here, the function of a magnetic field induction by the magnetic members 41 and 42 will be explained in detail. As shown in FIG. 6, as the first supporting member 11 is rotated counter-clockwise, for example, the magnet 21 having the N polarity approaches the first end portion of the magnetic field detecting portion 31 and the magnet 22 having the S polarity approaches second end portion of the magnetic field detecting portion 31. In this case, as shown in FIG. 7, the magnetic member 41 is situated between the magnet 21 and the first end portion of the magnetic field detecting portion 31.

On the other hand, the magnetic member 42 is situated between the magnet 22 and the second end portion of the magnetic field detecting portion 31. Therefore, most of magnetic flux from the magnet 21 to the magnet 22 enters the magnetic member 41 instead of the first end portion of the magnetic field detecting portion 31 from the magnet 21. The magnetic flux thus entered the magnetic member 41 moves in the flat plate portion 41A of the magnetic member 41 in a direction toward the magnetic member 42.

In the first embodiment, the magnetic members 41 and 42 are apart from each other at the center portion of the magnetic field detecting portion 31 in the longitudinal direction. Therefore, upon approaching the magnetic member 42, the magnetic flux thus moved in the flat plate portion 41A of the magnetic member 41 does not enter the magnetic member 42 directly but enters the magnetic field detecting portion 31 from where being adjacent to an end portion of the center portion of the magnetic field detecting portion 31.

In the first embodiment, the magnetic flux thus entered where being adjacent to the end portion of the center portion of the magnetic field detecting portion 31 moves in the magnetic field detecting portion 31 toward the second end portion through the center of the magnetic field detecting portion 31 in the longitudinal direction and reaches where being adjacent to the second end portion of the center portion of the magnetic field detecting portion 31. Further, the magnetic flux enters the magnetic member 42, leaving the magnetic field detecting portion 31. The magnetic flux thus entered in the magnetic member 42 moves toward the magnet 22 in the flat plate portion 42A of the magnetic member 42. The magnetic flux thus moved reaches the magnet 22 from the magnetic member 42.

As described above, when the magnet 21 approaches the first end portion of the magnetic field detecting portion 31 and the magnet 22 approaches the second end portion of the magnetic field detecting portion 31, the magnetic field from magnet 21 to the magnet 22 is induced by the magnetic members 41 and 42. Therefore, the magnetic path is formed shown by arrows with solid lines in FIG. 7. As a result, most of the magnetic field is applied to the center portion of the magnetic field detecting portion 31. Accordingly, a magnetic flux density at the center portion of the magnetic field detecting portion 31 becomes higher compare to the magnetic flux density at the first end portion or the second end portion of the magnetic field detecting portion 31.

Further, a large region of the magnetic field detecting portion 31 is covered with the flat plate portions 41A and 42A of the magnetic members 41 and 42, including a portion thereof facing the first supporting member 11 at the first end portion and the second end portion thereof. In addition, the edge surfaces (the left edge surface and the right edge surface) of the magnetic field detecting portion 31 is covered with the side plate portions 41B and 42B of the magnetic members 41 and 42, respectively.

Accordingly, when the magnet 21 having the N polarity approaches the first end portion of the magnetic field detecting portion 31 as well as the magnet 22 having the S polarity approaches the second end portion of the magnetic field detecting portion 31, a magnetic field from the first end portion to the second end portion of the magnetic field detecting portion 31 is formed in a space surrounding the magnetic field detecting portion 31 and covered with magnetic members 41 and 42, as shown by arrows with broken lines in FIG. 7.

In the first embodiment, the magnetic field thus formed is applied not only to the center portion of the magnetic element 35 but also to the first end portion and the second end portion of the magnetic element 35. Most of the magnetic flux from the magnet 21 to the magnet 22 moves the magnetic path shown by the arrows with the solid lines. Therefore, the magnetic field shown by the arrows in FIG. 7 with the broken lines is weaker than the magnetic field shown by the arrows with the solid lines in FIG. 7. Accordingly, the magnetic flux density of the magnetic field detecting portion 31 is increased in total, as maintaining a state that the magnetic flux density at the center portion thereof is higher than the magnetic flux density at the first end portion or the second end portion thereof, since the magnetic field shown by the arrows with the solid lines in FIG. 7 is applied thereto.

Since the magnetic field described above is applied to the magnetic field detecting portion 31, the outer circumferential portion of the magnetic element 35 of the magnetic field detecting portion 31 is magnetized in a direction shown with a white arrow in FIG. 7, in other words, a direction from the first end portion to the second end portion of the magnetic field detecting portion 31. Therefore, when the outer circumferential portion of the magnetic element 35 is magnetized in the direction from the first end portion to the second end portion of the magnetic element 35, the orientation of magnetization of the outer circumferential portion of the magnetic element 35 is reversed. As a result, for example, the detection signal of the pulse wave having the sharp forward wave in the positive direction is output from the coil 36 wound around magnetic element 35.

Next, as shown in FIG. 8, when the first supporting member 11 is further rotated counter-clockwise 45 degree and the magnet 21 with the N polarity approaches the center portion of the magnetic field detecting portion 31, the magnetic member 42 is situated closer to the magnet 21 than the magnetic field detecting portion 31, as shown in FIG. 9. Therefore, most of the magnetic flux from the magnet 21 to the magnet 22 enters the magnetic member 42 from the magnet 21 instead of entering the center portion of the magnetic field detecting portion 31. The magnetic flux thus entered the magnetic member 42 moves in the magnetic member 42 toward the magnet 22.

Accordingly, it is possible to prevent the magnetic flux entering the magnetic field detecting portion 31. In addition, as shown in FIG. 8, the magnetic members 42 and 43 are apart from each other with the gap. Therefore, most of the magnetic flux moved in the magnetic member 42 does not enter the magnetic member 43.

Here, the dimension D1 (refer to FIG. 2) of the magnet 21 is configured to be larger than the distance D2 (refer to FIG. 2) between the opposite edge surface 41C of the magnetic member 41 and the opposite edge surface 42C of the magnetic member 42. Accordingly, when the magnet 21 approaches the center portion of the magnetic field detecting portion 31, each of the distance between the magnet 21 and the magnetic member 41, and the distance between the magnet 21 and the magnetic member 42 are certainly shorter than the distance between the magnet 21 and the magnetic field detecting portion 31. Therefore, when the magnet 21 approaches the center portion of the magnetic field detecting portion 31, most of the magnetic fluxes from the magnet 21 to the respective magnets 24 and 22 enter securely the magnetic members 41 and 42. Accordingly, it is possible to prevent effectively the magnetic flux from entering the magnetic field detecting portion 31.

Further, the large region of the magnetic field detecting portion 31 is covered with the flat plate portions 41A and 42A of the magnetic members 41 and 42, including a portion thereof facing the first supporting member 11 at the first end portion and the second end portion thereof. In addition, the edge surfaces (the left edge surface and the right edge surface) of the magnetic field detecting portion 31 is covered with the side plate portions 41B and 42B of the magnetic members 41 and 42, respectively. Accordingly, when the magnet 21 approaches the center portion of the magnetic field detecting portion 31, it is possible to increase the effect of preventing the magnetic fluxes from the magnet 21 to the respective magnets 24 and 22 from entering the magnetic field detecting portion 31.

Further, when the magnet 21 is situated right between the magnetic members 41 and 42, as shown in FIG. 9, the magnetic flux moving in the magnetic member 41 and the magnetic flux moving in the magnetic member 42 are symmetrically arranged. Therefore, the magnetic field from the magnet 21 to the magnet 22 and the magnetic field from the magnet 21 to the magnet 24 offset each other in the space surrounding the magnetic field detecting portion 31 and covered with magnetic members 41 and 42. As a result, the magnetic field becomes nearly zero.

As described above, when the magnet 21 approaches the center portion of the magnetic field detecting portion 31, the magnetic fields from the magnet 21 to the magnet 22 and 24 are induced by the magnetic members 41 and 42 so as to avoid the magnetic field detecting portion 31. As a result, most of the magnetic flux of the magnetic fields does not enter the magnetic field detecting portion 31. Therefore, the orientation of magnetization of the outer circumferential portion of the magnetic element 35 of the magnetic field detecting portion 31 is not changed. A direction pointed by a white arrow in FIG. 9 is the same as the direction pointed by the white arrow in FIG. 7, thereby meaning that the orientation of magnetization of the magnetic element 35 is not changed. As a result, the detection signal having the pulse wave is not output from the coil 36 wound around the magnetic element 35.

Next, as shown in FIG. 10, the magnet 24 with the S polarity approaches the first end portion of the magnetic field detecting portion 31 and the magnet 21 with the N polarity approaches the second end portion of the magnetic field detecting portion 31 as the first supporting member 11 is rotated counter-clockwise 45 degree further, the magnetic field from magnet 21 to the magnet 24 is induced by the magnetic members 41 and 42 so as to move in a direction opposite to the arrows with solid lines shown in FIG. 7. In other words, most of the magnetic flux from the magnet 21 reaches the magnet 24, sequentially moving through the magnetic member 42, the center portion of the magnetic field detecting portion 31 and the magnetic member 41. As a result, most of the magnetic field from the magnet 21 to the magnet 24 is applied to the center portion of the magnetic field detecting portion 31.

Accordingly, the magnetic flux density at the center portion of the magnetic field detecting portion 31 becomes higher compare to the magnetic flux density at the first end portion or the second end portion of the magnetic field detecting portion 31. Further, a relatively small magnetic field from the first end portion to the second end portion of the magnetic field detecting portion 31 is formed in the space surrounding the magnetic field detecting portion 31 and covered with magnetic members 41 and 42. As a result, the magnetic flux density of the magnetic field detecting portion 31 is increased in total, as maintaining a state that the magnetic flux density at the center portion thereof is higher than the magnetic flux density at the first end portion or the second end portion thereof.

Since the magnetic field described above is applied to the magnetic field detecting portion 31, the outer circumferential portion of the magnetic element 35 of the magnetic field detecting portion 31 is magnetized in a direction from the second end portion to the first end portion of the magnetic field detecting portion 31. Therefore, when the outer circumferential portion of the magnetic element 35 is magnetized in the direction from the second end portion to the first end portion of the magnetic element 35, the orientation of magnetization of the outer circumferential portion of the magnetic element 35 is reversed. As a result, for example, the detection signal of the pulse wave having the sharp forward wave in the negative direction is output from the coil 36 wound around magnetic element 35.

As described above, according to the function of the magnetic members 41 and 42, when the magnets having different polarities approach the first end portion and the second end portion of the magnetic field detecting portion 31 respectively, it is possible to induce the magnetic flux formed by the magnets so as to move in the center portion of the magnetic field detecting portion 31, rather than to the first end portion and the second end portion of the magnetic field detecting portion 31. Further, when the magnet approaches the center portion of the magnetic field detecting portion 31, it is possible to prevent the magnetic flux formed by the magnet from entering the magnetic field detecting portion 31.

Accordingly, when a pair of the magnets having different polarities from each other approaches the first end portion and the second end portion of the magnetic field detecting portion 31 respectively, it is possible to increase the magnetic flux density of the magnetic element 35, especially the center portion, of the magnetic field detecting portion 31. On the other hand, when the magnet approaches the center portion of the magnetic field detecting portion 31, it is possible to lower the magnetic flux density of the magnetic element 35 of the magnetic field detecting portion 31 in total. Therefore, only when the magnets having different polarities from each other approaches the first end portion and the second end portion of the magnetic field detecting portion 31 respectively, it is possible to increase the magnetic flux density of the magnetic element 35 of the magnetic field detecting portion 31.

Accordingly, only when the magnets having different polarities from each other approaches the first end portion and the second end portion of the magnetic field detecting portion 31 respectively, it is possible to change the orientation of magnetization of the magnetic element 35. Namely, it is possible to control so that the magnetic element 35 of the magnetic field detecting portion 31 does not change the direction of the magnetization thereof, as the magnets having different polarities from each other do not approach the first end portion and the second end portion of the magnetic field detecting portion 31 respectively.

Figure 11:
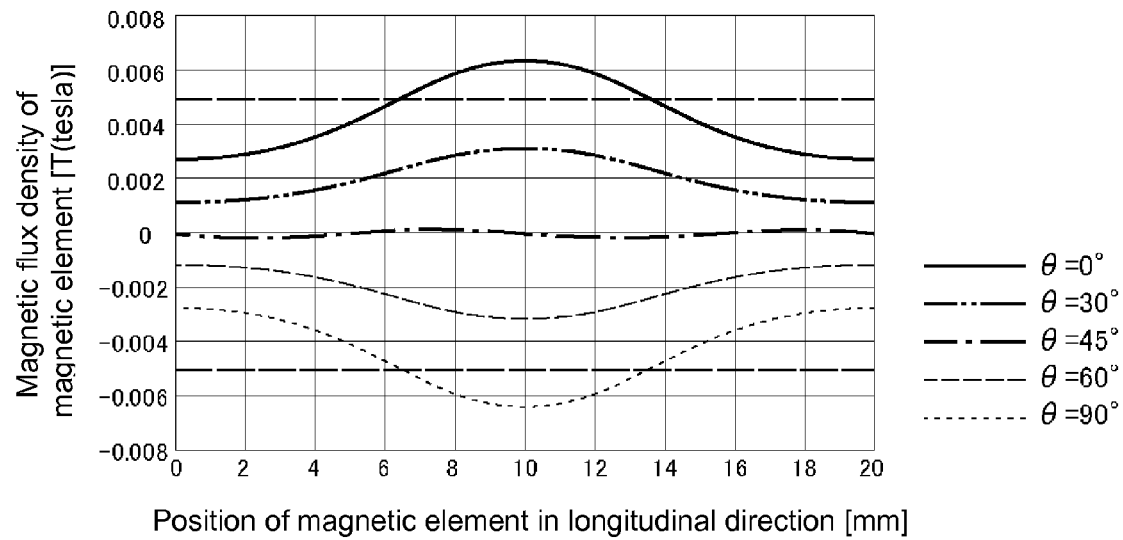
FIG. 11 is a graph showing a relationship between a position of a magnetic element in a longitudinal direction and a magnetic flux density of the magnetic element of the rotation detecting device according to the first embodiment of the present invention.

FIG. 11 is a graph showing a relationship between a position of the magnetic element 35 in the longitudinal direction thereof and the magnetic flux density of the magnetic element 35, while the first supporting member 11 is rotated counter-clockwise from 0 to 90 degree. In FIG. 11, 0 mm in a position of the magnetic element 35 in the longitudinal direction corresponds to where the first end portion of the magnetic element 35 is situated, 10 mm in the position of the magnetic element 35 in the longitudinal direction corresponds to where the center portion of the magnetic element 35 is situated, and 20 mm in the position of the magnetic element 35 in the longitudinal direction corresponds to where the second end portion of the magnetic element 35 is situated.

Further, θ is a counter-clockwise rotation angle of the first supporting member 11. For example, when the magnets 21 and 22 approach the first end portion and the second end portion of the magnetic field detecting portion 31 respectively, the rotation angle of the first supporting member 11 is 0 degree (θ=0°) (refer to FIG. 6). In this case, when the rotation angle of the first supporting member 11 is 45 degree (θ=45°), the magnet 21 approach the center portion of the magnetic field detecting portion 31 (refer to FIG. 8). Further, when the rotation angle of the first supporting member 11 is 90 degree (θ=90°), the magnets 24 and 21 approach the first end portion and the second end portion of the magnetic field detecting portion 31 respectively, (refer to FIG. 10).

As shown with a solid line in FIG. 11, when the rotation angle of the first supporting member 11 is 0 degree, the magnetic flux density of the center portion of the magnetic field detecting portion 31 becomes the greatest in a positive direction. In this case, when the magnets 21 and 22 approach the first end portion and the second end portion of the magnetic field detecting portion 31 respectively, the magnetic field from magnet 21 to the magnet 22 moves in the center portion of the magnetic field detecting portion 31 as being induced by the magnetic members 41 and 42.

Further, as shown with a solid line in FIG. 11, when the rotation angle of the first supporting member 11 is 0 degree, the magnetic flux density of the first end portion and the second end portion of the magnetic field detecting portion 31 are also increased in the positive direction as compared with a case when the rotation angle of the first supporting member 11 is not 0 degree. In this case, when the magnets 21 and 22 approach the first end portion and the second end portion of the magnetic field detecting portion 31 respectively, the magnetic field from the first end portion to the second end portion of the magnetic field detecting portion 31 is formed in the space surrounding the magnetic field detecting portion 31 and covered with magnetic members 41 and 42. Further, the magnetic field thus formed is applied to the magnetic element 35.

Further, while the rotation angle of the first supporting member 11 is changed from 0 degree to 45 degree, the magnetic flux density of the magnetic element 35 changes toward zero as shown with a two-dot line in FIG. 11. In this case, as the magnets 21 and 22 leave the first end portion and the second end portion of the magnetic field detecting portion 31 respectively, the magnetic flux from the magnet 21 to the magnet 22 moving in the center portion of the magnetic field detecting portion 31 becomes less. At the same time, the magnetic field being formed in the space surrounding the magnetic field detecting portion 31 and covered with magnetic members 41 and 42 from the first end portion to the second end portion of the magnetic field detecting portion 31 is decreased.

Further, when the rotation angle of the first supporting member 11 is 45 degree, the magnetic flux density is nearly zero at each of the positions of the magnetic element 35 in the longitudinal direction. In this case, when the magnet 21 approach the center portion of the magnetic field detecting portion 31, both of the magnetic fluxes from the magnet 21 to the magnet 22 and from the magnet 21 to the magnet 24 are induced by the magnetic members 41 and 42 so as to avoid the magnetic field detecting portion 31. As a result, the magnetic flux thus induced does not enter the center portion of the magnetic field detecting portion 31. In addition, the effect to prevent the magnetic field from entering the magnetic field detecting portion 31 is increased since the region of the first end portion and the second end portion of the magnetic field detecting portion 31 are largely covered with the magnetic members 41 and 42.

Furthermore, while the rotation angle of the first supporting member 11 is changed from 45 degree to 90 degree, the magnetic flux density of the center portion of the magnetic element 35 is increased in the negative direction as shown with a broken line in FIG. 11. In this case, as the magnets 24 and 21 approach the first end portion and the second end portion of the magnetic field detecting portion 31 respectively, an extent of the magnetic flux from the magnet 21 to the magnet 24 moving in the center portion of the magnetic field detecting portion 31 is increased. At the same time, the magnetic field being formed in the space surrounding the magnetic field detecting portion 31 and covered with magnetic members 41 and 42 from the first end portion to the second end portion of the magnetic field detecting portion 31 is increased.

Further, when the rotation angle of the first supporting member 11 is 90 degree, the magnetic flux density of the center portion of the magnetic element 35 becomes the greatest in the negative direction, as shown with a broken line in FIG. 11. In this case, as the magnets 24 and 21 approach the first end portion and the second end portion of the magnetic field detecting portion 31 respectively, most of the magnetic flux from the magnet 21 to the magnet 24 is induced by the magnetic members 41 and 42 so as to movie in the center portion of the magnetic field detecting portion 31.

Furthermore, when the rotation angle of the first supporting member 11 is 0 degree, as shown with a broken line in FIG. 11, the magnetic flux density of the first end portion and the second end portion of the magnetic element 35 is increased in the negative direction compared to the case that the rotation angle of the first supporting member 11 is not 0 degree. Namely, when the magnets 24 and 21 approach the first end portion and the second end portion of the magnetic field detecting portion 31 respectively, the magnetic field from the second end portion to the first end portion of the magnetic field detecting portion 31 is formed in the space surrounding the magnetic field detecting portion 31 and covered with magnetic members 41 and 42. Further, the magnetic field thus formed is applied to the magnetic element 35.

In the first embodiment, the magnetic element 35 is configured so that the orientation of magnetization of the outer circumferential portion thereof is reversed when the magnetic flux density thereof reaches beyond 0.005 tesla in the positive direction or −0.005 tesla in the negative direction, as the magnetic flux density of the magnetic element 35 is changed as shown in FIG. 11 with the rotation angle of the first supporting member 11.

Accordingly, it is possible to provide the rotation detecting device 1 enabling that the orientation of magnetization of the magnetic element 35 is reversed certainly when the rotation angle of the first supporting member 11 is 0 degree or 90 degree and thereby certainly outputting the detection signal of the pulse wave having a sufficiently strong output level from the coil 36. Further, the rotation detecting device 1 thus provided also enables that the orientation of magnetization of the magnetic element 35 is not reversed when the rotation angle of the first supporting member 11 is 45 degree, and thereby certainly preventing the detection signal from being output from the coil 36. That is, enabling the rotation detecting device 1 to be capable of preventing the orientation of magnetization of the magnetic element 35 from being changed unpredictably and of detecting the rotation status of the first supporting member 11 (the object to be detected) with high precision.

In FIG. 11, the magnetic flux density of the magnetic element 35 is changed within a range from −0.008 tesla to 0.008 tesla. It should be noted that the range within which the magnetic flux density changes varies depending on electrical characters of the magnets 21, 22, 23 and 24, the magnetic element 35, and the like.

Figure 12:
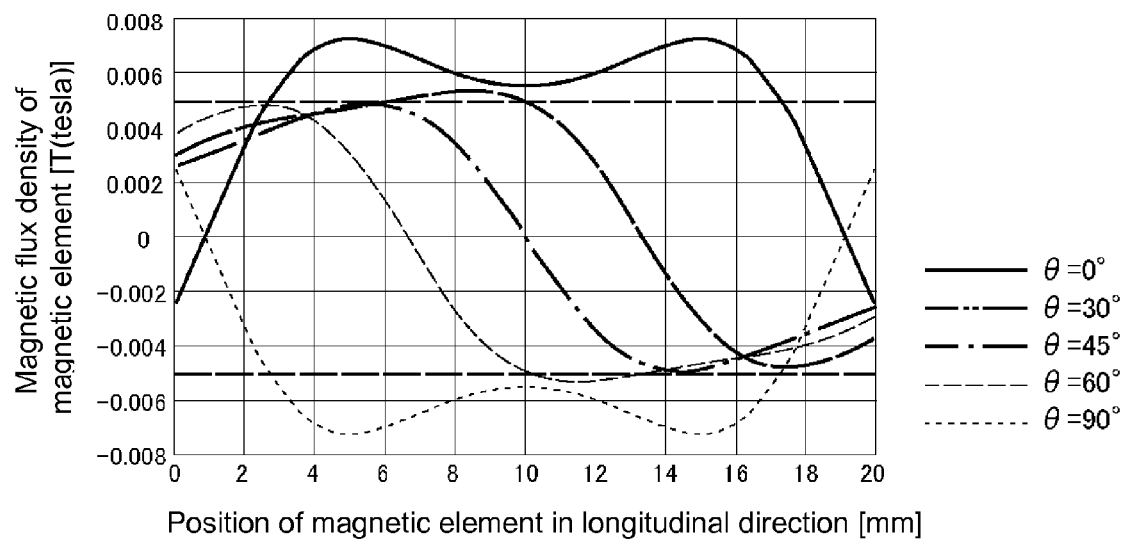
FIG. 12 is a graph showing the relationship between the position of the magnetic element in the longitudinal direction and the magnetic flux density of the magnetic element of a conventional rotation detecting device.

A conventional rotation detecting device will be explained next with reference to FIG. 12. As opposed to the rotation detecting device 1 in the first embodiment of the present invention, the conventional rotation detecting device does not have the magnetic members 41 to 46. FIG. 12 is a graph showing the relationship between the position of the magnetic element 35 in the longitudinal direction and the magnetic flux density of the magnetic element 35 of the magnetic field detecting portion 31 of the conventional rotation detecting device when the first supporting member 11 is rotated from the rotational angle of 0° to 90°.

As described above, the conventional rotation detecting device does not have the magnetic members 41 to 46 for covering the magnetic field detecting portion 31. Accordingly, the magnetic field is not induced with the magnetic members 41 to 46 as described above. In this case, when the first supporting member 11 is rotated to the rotational angle of 45°, and the magnet 21 approaches the center portion of the magnetic field detecting portion 31, the magnetic flux density becomes 0.005 tesla near the position of 5 mm of the magnetic field detecting portion 31 in the longitudinal direction and −0.005 tesla near the position of 15 mm of the magnetic field detecting portion 31 in the longitudinal direction as indicated with a projected line in FIG. 12.

As shown in FIG. 12, in the conventional rotation detecting device that does not have the magnetic members 41 to 46, when the magnet 21 approaches the center portion of the magnetic field detecting portion 31, the magnetic flux density becomes excessively large in the positive (the negative) direction at the one end portion of the magnetic field detecting portion 31, and excessively large in the negative (the positive) direction at the other end portion of the magnetic field detecting portion 31. As a result, when the magnet 21 approaches the center portion of the magnetic field detecting portion 31, the orientation of the magnetization of the magnetic element 35 may be inverted. Or worse, it is difficult to predict whether the orientation of the magnetization of the magnetic element 35 is inverted. Consequently, the detection signal may be output at an unpredictable timing, thereby making it difficult to accurately detect the rotation of the first supporting member 11 (the detection object).

On the other hand, in the first embodiment of the present invention, the rotation detecting device 1 is provided with the magnetic members 41 to 46. Accordingly, as shown in FIG. 11, when the first supporting member 11 is rotated to the rotational angle of 45°, magnetic flux density becomes substantially zero at any location of the magnetic field detecting portion 31 along the longitudinal direction thereof. As evident from the comparison between FIG. 11 and FIG. 12 in terms of the magnetic flux density of the magnetic element 35, when the rotation detecting device 1 is provided with the magnetic members 41 to 46, it is possible to accurately detect the rotation of the first supporting member 11 (the detection object).

Figure 13:
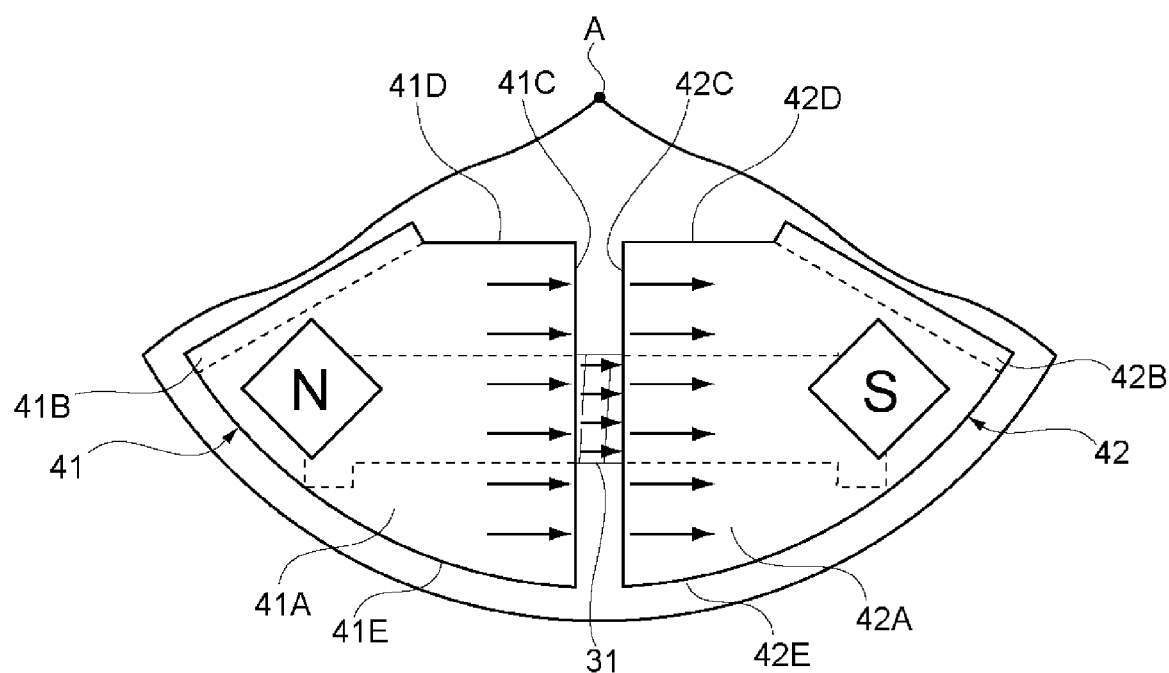
FIG. 13 is an enlarged schematic plan view showing the magnetic filed in the magnetic members of the rotation detecting device according to the first embodiment of the present invention.

A further structural characteristic of the magnetic members 41 to 46 for effectively inducing the magnetic field will be explained next with reference to FIG. 13. FIG. 13 is an enlarged schematic plan view showing the magnetic filed in the magnetic members 41 and 42 of the rotation detecting device 1 according to the first embodiment of the present invention. In FIG. 13, the magnetic field, which is generated in the magnetic members 41 and 42 when the magnets 21 and 22 approach the one end portion and the other end portion of the magnetic field detecting portion 31, respectively, is schematically represented with arrows.

In the first embodiment, the inner circumferential side edge surface 41D of the magnetic member 41 facing the axial line A and the inner circumferential side edge surface 42D of the magnetic member 42 facing the axial line A extend in the direction in parallel to the longitudinal direction of the magnetic field detecting portion 31. Accordingly, when the magnets 21 and 22 approach the one end portion and the other end portion of the magnetic field detecting portion 31, respectively, the magnetic flux proceeding through the magnetic member 41 and the magnetic flux proceeding through the magnetic member 42 proceed in the direction substantially in parallel to the longitudinal direction of the magnetic field detecting portion 31.

As a result, it is possible to prevent the magnetic flux proceeding through the magnetic member 41 and the magnetic flux proceeding through the magnetic member 42 from dispersing away from the magnetic field detecting portion 31. In particular, it is possible to prevent the magnetic flux proceeding through the magnetic member 41 from dispersing from the inner circumferential side edge surface 41D to an outside of the magnetic member 41. Further, it is possible to prevent the magnetic flux proceeding through the magnetic member 42 from dispersing from the inner circumferential side edge surface 42D to an outside of the magnetic member 42. Accordingly, when the magnets 21 and 22 approach the one end portion and the other end portion of the magnetic field detecting portion 31, respectively, the magnetic members 41 and 42 effectively induce the magnetic field proceeding from the magnet 21 to the magnet 22 toward the magnetic field detecting portion 31. As a result, it is possible to maintain the magnetic flux density in the magnetic field detecting portion 31 at the stable and high level.

Further, in the first embodiment, the opposite edge surface 41C of the magnetic member 41 and the opposite side edge surface 42C of the magnetic member 42 extend in the direction perpendicular to the axial line A and the longitudinal direction of the magnetic field detecting portion 31. Accordingly, when the magnets 21 and 22 approach the one end portion and the other end portion of the magnetic field detecting portion 31, respectively, the magnetic flux proceeding through the magnetic member 41 and the magnetic flux proceeding through the magnetic member 42 proceed in the direction substantially in parallel to the longitudinal direction of the magnetic field detecting portion 31.

As a result, it is possible to prevent the magnetic flux proceeding through the magnetic member 41 and the magnetic flux proceeding through the magnetic member 42 from dispersing away from the magnetic field detecting portion 31. In particular, it is possible to effectively prevent the magnetic flux from dispersing when the magnetic flux proceeding through the magnetic member 41 from the magnet 21 to the magnet 22 proceeds from the opposite edge surface 41C to an outside of the magnetic member 41. Accordingly, when the magnets 21 and 22 approach the one end portion and the other end portion of the magnetic field detecting portion 31, respectively, the magnetic members 41 and 42 effectively induce the magnetic field proceeding from the magnet 21 to the magnet 22 toward the magnetic field detecting portion 31. As a result, it is possible to maintain the magnetic flux density in the magnetic field detecting portion 31 at the stable and high level.

As described above, the further structural characteristic of the magnetic members 41 and 42 for effectively inducing the magnetic field relative to the magnetic field detecting portion 31 is explained. It should be noted that the magnetic members 43 and 44 have the similar structural characteristic for effectively inducing the magnetic field relative to the magnetic field detecting portion 32. Further, the magnetic members 45 and 46 have the similar structural characteristic for effectively inducing the magnetic field relative to the magnetic field detecting portion 33. Accordingly, with the magnetic field inducing function of the magnetic members 41 to 46, it is possible to prevent the unpredictable change in the orientation of the magnetization of the magnetic element 35 in each of the magnetic field detecting portions 31 to 33, thereby making it possible to accurately detect the rotation of the detection object.

Second Embodiment

Figure 14:
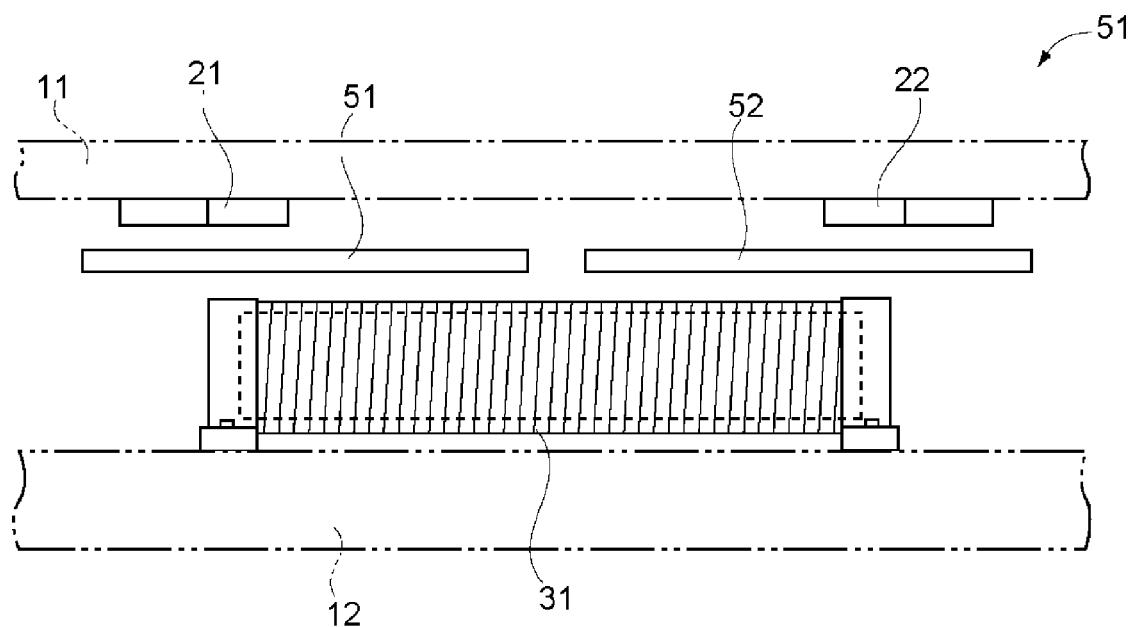
FIG. 14 is a schematic side view showing a configuration of a rotation detecting device according to a second embodiment of the present invention.

A second embodiment of the present invention will be explained next. In the first embodiment, the rotation detecting device 1 includes the magnetic members 41 to 46 having the side plate portions 41B to 46B. In the second embodiment, a rotation detecting device 51 includes magnetic members 51 and 52 not having the side plate portions. FIG. 14 is a schematic side view showing a configuration of the rotation detecting device 51 according to the second embodiment of the present invention.

It should be noted that the effect of the magnetic members may be different between the rotation detecting device 1 with the side plate portions 41B to 46B in the first embodiment and the rotation detecting device 51 without the side plate portions in the second embodiment. The difference will be explained with reference to FIGS. 7, 11, 14, and 15.

Figure 15:
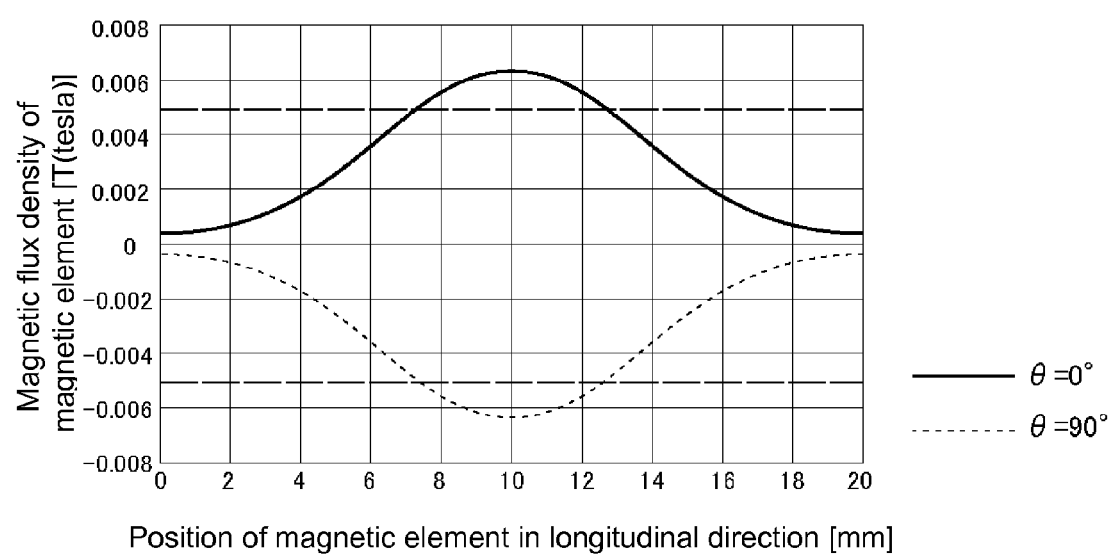
FIG. 15 is a graph showing a relationship between a position of a magnetic element in a longitudinal direction and a magnetic flux density of the magnetic element of the rotation detecting device according to the second embodiment of the present invention.

FIG. 15 is a graph showing a relationship between a position of the magnetic element 35 in the longitudinal direction and the magnetic flux density of the magnetic element 35 of the magnetic field detecting portion 31 of the rotation detecting device 51 according to the second embodiment of the present invention. In FIG. 15, the first supporting member 11 is rotated at the rotational angles of 0° and 90°.

In the first embodiment, as shown in FIG. 7, the magnetic members 41 and 42 have the side plate portions 41B and 42B, respectively. Further, the side plate portions 41B and 42B are arranged to cover the one edge surface (the left edge surface) and the other edge surface (the right edge surface) of the magnetic field detecting portion 31, respectively. Accordingly, as shown as the hidden line arrow in FIG. 7, when the magnets 21 and 22 approach the one end portion and the other end portion of the magnetic field detecting portion 31, respectively, the magnetic field enters the one edge surface of the magnetic field detecting portion 31 from the side plate portion 41B, and further the magnetic field proceeds from the other edge surface of the magnetic field detecting portion 31 to the side plate portion 42B.

As a result, as opposed to the case that the magnets 21 and 22 are situated away from the one end portion and the other end portion of the magnetic field detecting portion 31, respectively, when the magnets 21 and 22 approach the one end portion and the other end portion of the magnetic field detecting portion 31, respectively, as shown in FIG. 11, the magnetic flux density increases at the one end portion and the other end portion of the magnetic field detecting portion 31 in addition to the center portion of the magnetic field detecting portion 31.

On the other hand, in the second embodiment, as shown in FIG. 14, the magnetic members 51 and 52 do not have the side plate portions, the one edge surface (the left edge surface) and the other edge surface (the right edge surface) of the magnetic field detecting portion 31 are not covered with the side plate portions. Accordingly, when the magnets 21 and 22 approach the one end portion and the other end portion of the magnetic field detecting portion 31, respectively, it is difficult to generate the magnetic field entering the one edge surface of the magnetic field detecting portion 31 or proceeding from the other edge surface of the magnetic field detecting portion 31.

As a result, as shown in FIG. 15, when the magnets 21 and 22 approach the one end portion and the other end portion of the magnetic field detecting portion 31, respectively, the magnetic flux density does not increase at the one end portion and the other end portion of the magnetic field detecting portion 31, and maintains the same level as that in the case that the magnets 21 and 22 are situated away from the one end portion and the other end portion of the magnetic field detecting portion 31, respectively.

In order to securely change the orientation of the magnetization of the magnetic element 35, and to stably obtain the detection signal with the high output level, it is preferred that the magnetic flux density of the magnetic element 35 increases as a whole when the magnets 21 and 22 approach the one end portion and the other end portion of the magnetic field detecting portion 31, respectively. Accordingly, it is preferred that the magnetic members 41 and 42 have the side plate portions 41B and 42B, respectively.

Third Embodiment

A third embodiment of the present invention will be explained next. In the first embodiment, the four magnets 21, 22, 23, and 24 are disposed on the first supporting member 11 with the interval of 90°, and the three magnetic field detecting portions 31, 32, and 33 are disposed on the second supporting member 12. The present invention is not limited to the configuration. For example, it is sufficient to dispose more two magnets, and the interval of the magnets is arbitrary. Further, the number and the interval of the magnetic field detecting portions are also arbitrary. It is preferred that the interval of the magnets and the interval of the magnetic field detecting portions are appropriately determined such that the detection signals output from magnetic field detecting portions are not overlapped while the first supporting member 11 is rotated.

Figure 16:
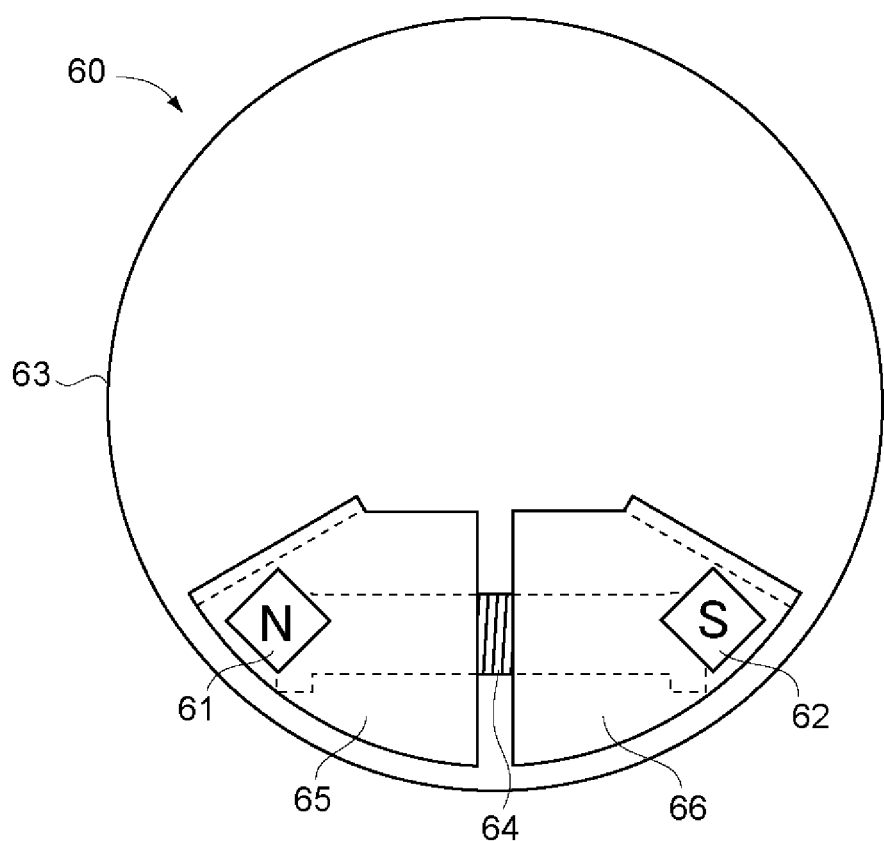
FIG. 16 is a schematic plan view showing a configuration of a rotation detecting device according to a third embodiment of the present invention.

FIG. 16 is a schematic plan view showing a configuration of a rotation detecting device 60 according to the third embodiment of the present invention. As shown in FIG. 16, in the rotation detecting device 60, two magnets 61 and 62 are disposed on the first supporting member 11, and one magnetic field detecting portion 64 disposed on a second supporting member 63. Further, magnetic members 65 and 66 are provided for covering one end portion and the other end portion of the magnetic field detecting portion 64.

In the second embodiment, the shape of the magnets 61 and 62 disposed on the first supporting member 11 is arbitrary, and is not limited to a specific one. Further, the magnets 61 and 62 may be formed of an electrical magnet.

In the first embodiment, the magnetic element 35 of each of the magnetic field detecting portions 31, 32, and 33 is formed of the composite magnetic wire, and may be formed of a Barkhausen element. Further, the magnetic members 41 to 46 are formed of iron as the magnetic material. The present invention is not limited thereto, and the magnetic members 41 to 46 may be formed of other magnetic material or an electromagnetic material such as permalloy, electromagnetic steel plate, and the like.

Figure 17:
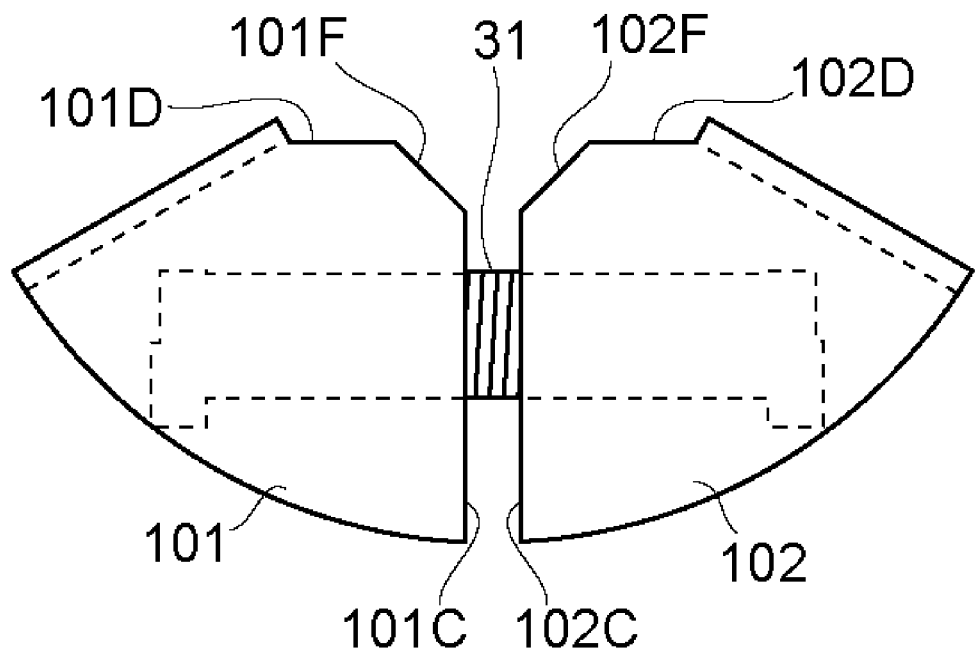
FIG. 17 is a schematic plan view showing a modified example No. 1 of a magnetic member of the rotation detecting device according to the third embodiment of the present invention.

According to the present invention, the shape of the magnetic members 41 to 46 may be modified in various ways. FIG. 17 is a schematic plan view showing a modified example No. 1 of magnetic members 101 and 102 of the rotation detecting device according to the third embodiment of the present invention.

As shown in FIG. 17, the magnetic member 101 has an opposite edge surface 101C and an inner circumferential side edge surface 101D, and the magnetic member 102 has an opposite edge surface 102C and an inner circumferential side edge surface 102D. A corner of the magnetic member 101, where the opposite edge surface 101C crosses with the inner circumferential side edge surface 101D, is cut off to form an inclined surface 101F between the opposite edge surface 101C and the inner circumferential side edge surface 101D. Further, a corner of the magnetic member 102, where the opposite edge surface 102C crosses with the inner circumferential side edge surface 102D, is cut off to form an inclined surface 102F between the opposite edge surface 102C and the inner circumferential side edge surface 102D.

Figure 18:
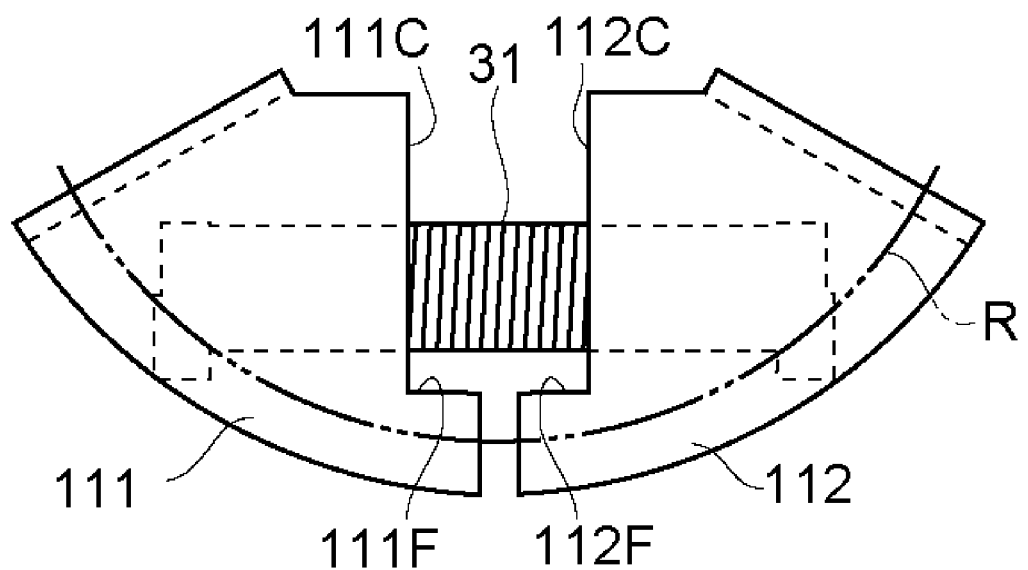
FIG. 18 is a schematic plan view showing a modified example No. 2 of the magnetic member of the rotation detecting device according to the third embodiment of the present invention.

FIG. 18 is a schematic plan view showing a modified example No. 2 of magnetic members 111 and 112 of the rotation detecting device according to the third embodiment of the present invention.

As shown in FIG. 18, the magnetic member 111 has a step portion 111F on an opposite edge surface 111C thereof, and the magnetic member 112 has a step portion 112F on an opposite edge surface 112C thereof. Accordingly, a distance between the opposite edge surface 111C and the opposite edge surface 112C is partially varied. More specifically, the distance between the opposite edge surface 111C and the opposite edge surface 112C is enlarged at a location corresponding to the center portion of the magnetic field detecting portion 31. Further, the distance between the opposite edge surface 111C and the opposite edge surface 112C is reduced at a location corresponding to the area where each of the magnets 21, 22, 23, and 24 passes through (a location corresponding to the circumference R).

Figure 19:
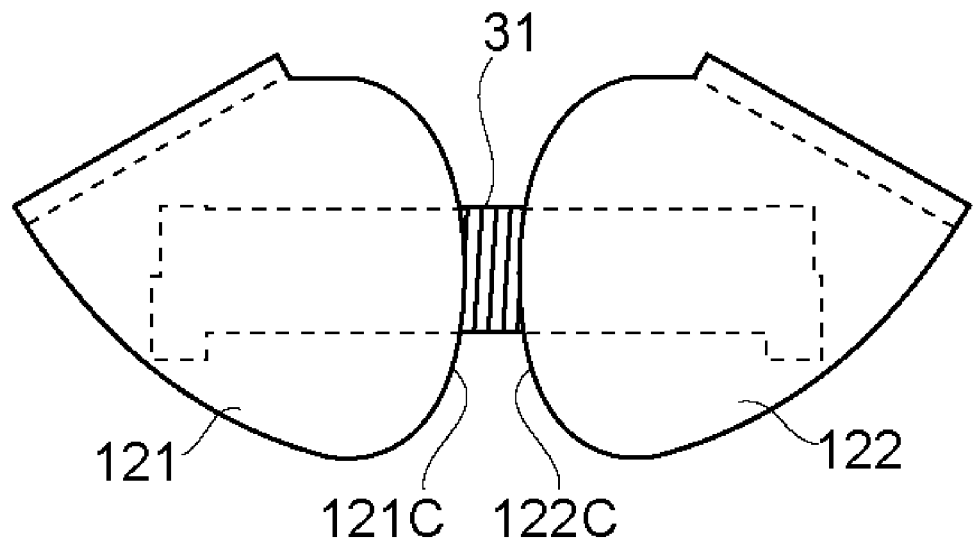
FIG. 19 is a schematic plan view showing a modified example No. 3 of the magnetic member of the rotation detecting device according to the third embodiment of the present invention.

FIG. 19 is a schematic plan view showing a modified example No. 3 of magnetic members 121 and 122 of the rotation detecting device according to the third embodiment of the present invention.

As shown in FIG. 19, the magnetic member 121 has an opposite edge surface 121C formed in an arc shape, and the magnetic member 122 has an opposite edge surface 122C formed in an arc shape. Accordingly, a distance between the opposite edge surface 121C and the opposite edge surface 122C becomes minimum at a location corresponding to the center portion of the magnetic field detecting portion 31.

Figure 20:
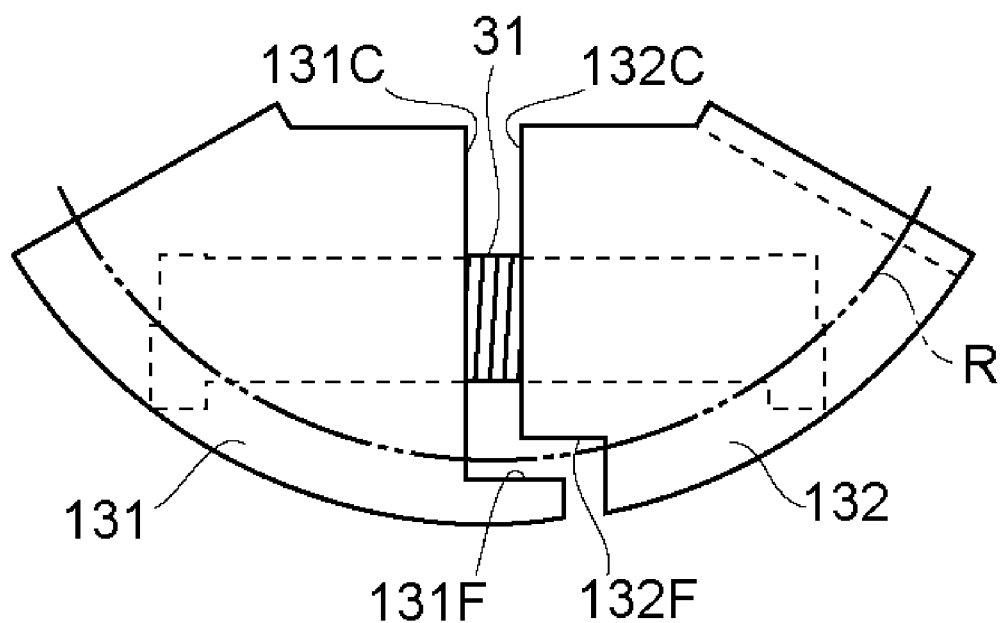
FIG. 20 is a schematic plan view showing a modified example No. 4 of the magnetic member of the rotation detecting device according to the third embodiment of the present invention.

FIG. 20 is a schematic plan view showing a modified example No. 4 of magnetic members 131 and 132 of the rotation detecting device according to the third embodiment of the present invention.

As shown in FIG. 20, the magnetic member 131 has a crank portion 131F curved in a crack shape on an opposite edge surface 131C thereof, and the magnetic member 132 has a crank portion 132F curved in a crack shape on an opposite edge surface 132C thereof. Further, the crank portion 131F and the crank portion 132F are situated at a location corresponding to the area where each of the magnets 21, 22, 23, and 24 passes through (a location corresponding to the circumference R).

As described above, in the first embodiment, it is configured such that the first supporting member 11 and the magnets 21, 22, 23, and 24 disposed thereon are rotated. Alternatively, it may be configured such that the second supporting member 12 and the magnetic field detecting portion 31, 32, and 33 disposed thereon are rotated.

The disclosure of Japanese Patent Application No. 2012-193706 filed on Sep. 4, 2013, is incorporated in the application by reference.

While the invention has been explained with reference to the specific embodiments of the invention, the explanation is illustrative and the invention is limited only by the appended claims.

What is claimed is:

1. A rotation detecting device, comprising:
a first supporting member disposed around an axial line;
a second supporting member situated away from the first supporting member along the axial line, at least one of said first supporting member and said second supporting member being arranged to be rotatable around the axial line;
a pair of magnetic field generating portions attached to the first supporting member to face the second supporting member for generating a magnetic field between the first supporting member and the second supporting member, said magnetic field generating portions being arranged around the axial line and away from each other along a circumferential direction around the axial line, one of said magnetic field generating portions having a polarity opposite to that of the other of the magnetic field generating portions;
a magnetic field detecting portion attached to the second supporting member to face the first supporting member for detecting the magnetic field generated with the magnetic field generating portions, said magnetic field detecting portion including a magnetic element with a coil wound thereon arranged so that a longitudinal direction of the magnetic element is in parallel to a tangential direction of a circumference around the axial line and over the magnetic field generating portions;
a first magnetic member attached to the second supporting member for covering one end portion of the magnetic field detecting portion in the longitudinal direction of the magnetic element; and
a second magnetic member attached to the second supporting member for covering the other end portion of the magnetic field detecting portion in the longitudinal direction of the magnetic element,
wherein said first magnetic member is arranged to face the second magnetic member at a center portion of the magnetic field detecting portion with a space in between.

2. The rotation detecting device according to claim 1, wherein said magnetic field detecting portion includes the magnetic element formed in a bar shape, a wire shape, or a plate shape so that an orientation of magnetization of the magnetic element varies along the longitudinal direction thereof.

3. The rotation detecting device according to claim 1, wherein said first magnetic member extends from the one end portion of the magnetic field detecting portion toward an inner circumference and an outer circumference of the second supporting member so that the first magnetic member covers the second supporting member on both sides of the one end portion of the magnetic field detecting portion, and
said second magnetic member extends from the other end portion of the magnetic field detecting portion toward the inner circumference and the outer circumference of the second supporting member so that the second magnetic member covers the second supporting member on both sides of the other end portion of the magnetic field detecting portion.

4. The rotation detecting device according to claim 1, wherein said first magnetic member includes a first edge surface facing a second edge surface of the second magnetic member at the center portion of the magnetic field detecting portion, and
said first edge surface and said second edge surface extend in a direction perpendicular to the axial line and the longitudinal direction of the magnetic field detecting portion.

5. The rotation detecting device according to claim 1, wherein said first magnetic member includes a third edge surface facing the axial line,
said third edge surface extends in a direction in parallel to the longitudinal direction of the magnetic field detecting portion,
said second magnetic member includes a fourth edge surface facing the axial line, and
said fourth edge surface extends in a direction in parallel to the longitudinal direction of the magnetic field detecting portion.

6. The rotation detecting device according to claim 1, wherein said first magnetic member is arranged to cover an edge surface of the one end portion of the magnetic field detecting portion, and
said second magnetic member is arranged to cover an edge surface of the other end portion of the magnetic field detecting portion.

7. The rotation detecting device according to claim 1, wherein each of said magnetic field generating portions is formed of a permanent magnet, and each of said magnetic field generating portions has a length along the circumferential direction or the tangential direction greater than the space between the first magnetic member and the second magnetic member.

8. The rotation detecting device according to claim 1, wherein said magnetic field detecting portion includes the magnetic element formed of a large Barkhausen element.

9. The rotation detecting device according to claim 1, wherein said magnetic field detecting portion includes at least a first magnetic field detecting portion, a second magnetic field detecting portion, and a third magnetic field detecting portion each arranged along the circumferential direction.

10. The rotation detecting device according to claim 9, wherein said first magnetic member includes three separate members for covering one end portion of each of the first magnetic field detecting portion, the second magnetic field detecting portion, and third magnetic field detecting portion, said second magnetic member includes three separate members for covering the other end portion of each of the first magnetic field detecting portion, the second magnetic field detecting portion, and third magnetic field detecting portion, and said three separate members of the first magnetic member and the second magnetic member are arranged alternately along the circumferential direction.

* * * * *